US012662320B1

(12) United States Patent

Weickert et al.

(10) Patent No.: US 12,662,320 B1

(45) Date of Patent: Jun. 23, 2026

(54) ADJUSTABLE CONVEYOR GUIDE RAIL

(71) Applicant: Nercon Eng. & Mfg., Inc., Neenah, WI (US)

(72) Inventors: Michael Paul Weickert, Oshkosh, WI (US); John Michael Sickinger, Appleton, WI (US)

(73) Assignee: Nercon Eng. & Mfg., Inc., Neenah, WI (US)

( * ) Notice: Subject to any disclaimer, the term of this patent is extended or adjusted under 35 U.S.C. 154(b) by 142 days.

(21) Appl. No.: 18/443,122

(22) Filed: Feb. 15, 2024

(51) Int. Cl.
    *B65G 15/60* (2006.01)

(52) U.S. Cl.
    CPC .................................... *B65G 15/60* (2013.01)

(58) Field of Classification Search
    None
    See application file for complete search history.

(56) References Cited

U.S. PATENT DOCUMENTS

| | | | | | |
|---|---|---|---|---|---|
| 3,527,336 | A | * | 9/1970 | Johnston | B65G 21/2072 |
| | | | | | 193/38 |
| 5,211,280 | A | * | 5/1993 | Houde | B65G 21/2072 |
| | | | | | 198/836.3 |
| 5,291,988 | A | * | 3/1994 | Leonard | B65G 21/2072 |
| | | | | | 198/836.3 |
| 6,050,396 | A | * | 4/2000 | Moore | B65G 21/2072 |
| | | | | | 198/836.3 |
| 6,053,654 | A | * | 4/2000 | Ledingham | B65G 21/2072 |
| | | | | | 403/312 |

| | | | | | |
|---|---|---|---|---|---|
| 6,059,096 | A | * | 5/2000 | Gladieux | B65G 21/2072 |
| | | | | | 198/836.3 |
| 6,378,695 | B1 | * | 4/2002 | Rinne | B65G 21/2072 |
| | | | | | 198/836.3 |
| 6,454,084 | B2 | * | 9/2002 | Csiki | B65G 21/2072 |
| | | | | | 198/836.3 |

(Continued)

FOREIGN PATENT DOCUMENTS

| | | | | |
|---|---|---|---|---|
| DE | 102015006979 | | 12/2016 | |
| DE | 102015006979 | A1 * | 12/2016 | ......... B65G 21/2072 |

(Continued)

OTHER PUBLICATIONS

Google Patents, translation of DE 102015006979 as viewed at https://patents.google.com/patent/DE102015006979A1/en?oq=DE+102015006979 on Jun. 16, 2025.

*Primary Examiner* — Gene O Crawford
*Assistant Examiner* — Muhammad Awais
(74) *Attorney, Agent, or Firm* — Brannen Law Office, LLC

(57) ABSTRACT

An adjustable guide rail is provided for use with a conveyor having a frame, a conveying surface having a curve or turn with an inside radius and an outside radius, an adjustment assembly, and a drive assembly. The guide rail can be an assembly in one embodiment with multiple guide rail segments, each being able to be fixed on one end and an adjustment slot on the other end relative to the conveyor surface. Each segment can engage a portion of the adjustment assembly. The adjustment assembly selectably moves each guide rail segment in and out perpendicular to the conveying surface. In another embodiment, the guide rail curve piece can be a single piece having multiple openings therethrough allowing one of the openings to be held in fixed longitudinal position with respect to the conveyor surface.

18 Claims, 25 Drawing Sheets

(56)  References Cited

U.S. PATENT DOCUMENTS

| | | | | |
|---|---|---|---|---|
| 7,431,150 B2 * | 10/2008 | Ranger | ................. | B65G 21/10 |
| | | | | 198/840 |
| 8,186,503 B1 * | 5/2012 | Burchell | ............ | B65G 21/2072 |
| | | | | 198/836.3 |
| 8,490,780 B2 | 7/2013 | Bell et al. | | |
| 8,695,787 B2 | 4/2014 | Bell et al. | | |
| 8,776,999 B2 | 7/2014 | Yohe et al. | | |
| 11,787,638 B2 * | 10/2023 | Korte | ................ | B65G 21/2072 |
| | | | | 198/836.3 |
| 2003/0164280 A1 * | 9/2003 | Delaporte | .......... | B65G 21/2072 |
| | | | | 198/836.3 |
| 2011/0079493 A1 * | 4/2011 | Bell | ................... | B65G 21/2072 |
| | | | | 198/836.3 |
| 2013/0068596 A1 * | 3/2013 | Yohe | ..................... | B65G 21/14 |
| | | | | 198/837 |
| 2013/0075236 A1 * | 3/2013 | Bell | ................... | B65G 21/2063 |
| | | | | 198/836.3 |
| 2016/0122132 A1 * | 5/2016 | Bell | ................... | B65G 21/2072 |
| | | | | 198/836.3 |
| 2017/0066596 A1 * | 3/2017 | Weickert | ............ | B65G 21/2072 |
| 2022/0127081 A1 * | 4/2022 | Yohe | ................. | B65G 21/2072 |

FOREIGN PATENT DOCUMENTS

| | | | | |
|---|---|---|---|---|
| EP | 2821353 A1 * | 1/2015 | ......... | B65G 21/2072 |
| WO | 2020026286 | 2/2020 | | |
| WO | WO-2020026286 A1 * | 2/2020 | ............ | B65G 21/06 |

* cited by examiner

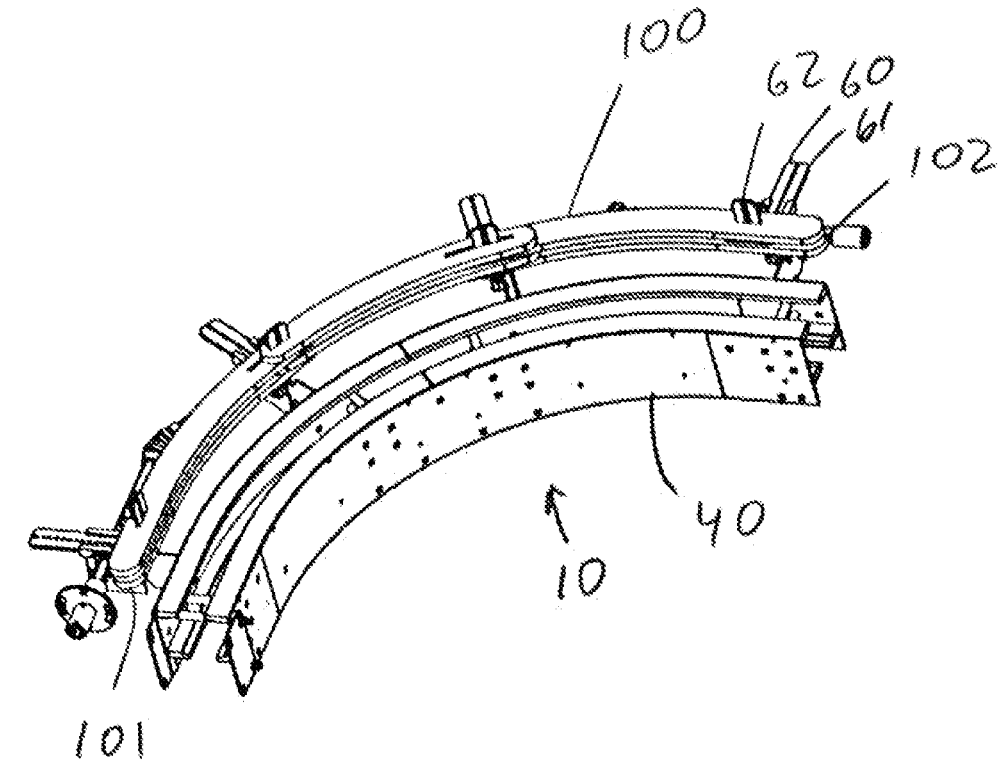
FIG.. 4
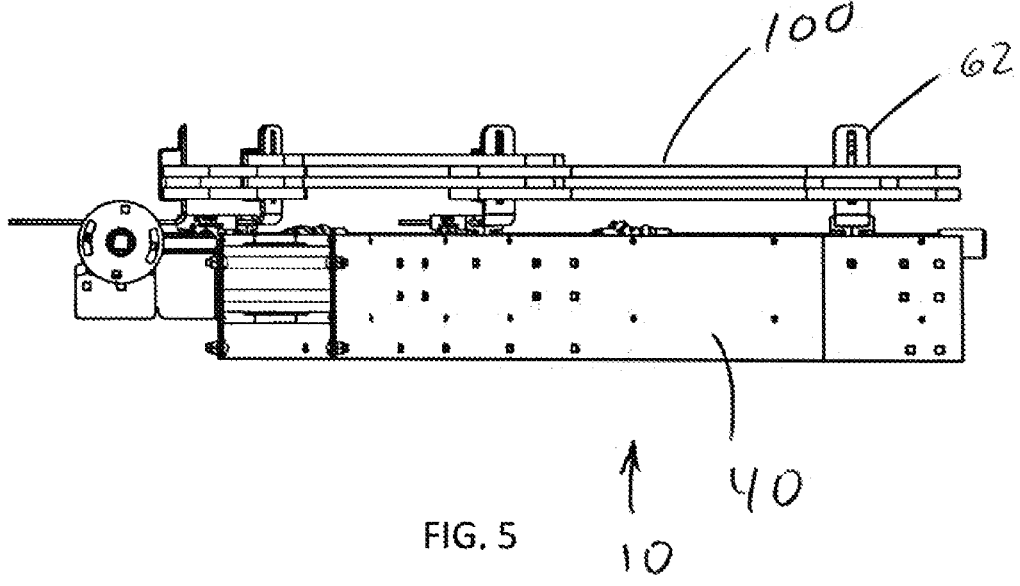
FIG. 5

*200*

*40*

*10*

*200*

*202*

*201*

ADJUSTABLE CONVEYOR GUIDE RAIL

BACKGROUND OF THE INVENTION

1. Field of the Invention

The present invention relates to an adjustable conveyor guide rail, and in one embodiment, to a guide rail having multiple segments each with a position hole and an adjustment slot, and in another embodiment to segments having adjustment slots on both ends, and in another embodiment, to a single member guide rail with a central position hole and two end adjustment slots.

2. Description of the Related Art

The use of guide rails on conveyors is not new. The guide rails provide a function of keeping product on the conveyor belt. Adjustable rails are also known. Adjustments are relatively simple for straight segments of guide rails, as the entire rail can be linearly moved inward or outward, as desired, without having to account for changing longitudinal dimensions. However, with curved guide rails, both interior and exterior corners, the overall length is accounted for. In some designs, there are overlapping sections that allow the overall length of the guide rail in the turn to change as the rail is moved in and out perpendicular to the conveyor axis of motion.

None of the known conveyor guide rails have the unique advantages of the present invention.

Thus, there exists a need for an adjustable guide rail that solves these and other problems.

SUMMARY OF THE INVENTION

An adjustable guide rail is provided for use with a conveyor having a frame, a conveying surface having a curve or turn with an inside radius and an outside radius, an adjustment assembly, and a drive assembly. The guide rail can be an assembly in one embodiment with multiple guide rail segments, each being able to be fixed on one end and an adjustment slot on the other end relative to the conveyor surface. Each segment can engage a portion of the adjustment assembly. The adjustment assembly selectably moves each guide rail segment in and out perpendicular to the conveying surface. In another embodiment, the guide rail curve piece can be a single piece having multiple openings therethrough allowing one of the openings to be held in fixed longitudinal position with respect to the conveyor surface.

There are many aspects of the present invention, including several embodiments of the invention, which each can have unique and independent advantages, as set out in particular in the appended claims.

According to one advantage of one embodiment of the present invention having multiple guide rail segments, a guide rail can be provided that have fixed positions relative to longitudinal direction of the conveyor path at each end of the turn. This can be accomplished with a multiple segment guide rail by having position holes that are located at the ends of the curve so that the ends of the guide rail are held lengthwise in fixed positions relative to the conveyor.

According to another advantage of one embodiment of the present invention having multiple guide rail segments, the adjustment slots can be interior of the ends of the curve. In this regard, the overall assembly length can change as it moves in and out perpendicular to the conveyor, but the ends of the rail assembly remain in a fixed longitudinal position relative the conveyor frame. Hence, the overall effective length changes but the end locations relative to the conveyor do not change.

According to a still further advantage yet of one embodiment of the present invention having multiple guide rail segments, the adjustment assembly engages both ends of each segment to move the segment in and out perpendicular to the conveyor axis of movement, yet only constrains one end of each segment longitudinally.

According to a further advantage yet of one embodiment of the present invention having multiple guide rail segments, each segment is held in a fixed longitudinal position with respect to the conveyor at one point. Hence, each segment can contribute (preferably equally for an arc shaped curve) to the overall change in overall length of the guide rail.

According to a still further advantage yet of one embodiment of the present invention having multiple guide rail segments, it is modular in size, shape and length or curve. In this regard, the curve can two or more segments to achieve an angle, length, or other specification.

According to a still further advantage yet of one embodiment of the present invention having multiple guide rail segments, the guide rails are adaptable both to OEM installations and retrofit installations.

According to a still further advantage yet of one embodiment of the present invention having multiple guide rail segments, clips can be used to retain the segments on the vertical segments of the adjustment assembly. Yet, the rail segments are preferably not fastened thereto.

According to a still further advantage yet of one embodiment of the present invention having multiple guide rail segments, rail segments can be vertically stacked to achieve a guide rail of a desired height. To this end, spacers can be provided for use at the ends of the curve between spaced end rail segments, so that vertically stacked segments remain parallel to each other and desired vertical segment spacing can be achieved. As an alternative, the brackets can be adjusted to an appropriate height to adjust the height instead of using a spacer.

According to an advantage of a single member guide rail of the present invention, the guide rail can have a central position hole and also have an adjustment slot at each end. In this regard, the single piece rail can remain centered relative to the turn. It can also be supported by a pointing device at the geometric center of the curve or turn.

According to another advantage of a single member embodiment of the present invention, reliefs are provided between the ends and center of the rail, allowing for the rail segment to have increased flexibility along its length between the hole and slots.

According to a further advantage yet of a single member embodiment of the present invention, the reliefs are formed on the outside surface of the guide rail relative to the conveying surface, wherein the interior side of the guide rail can be smooth adjacent to the conveying surface.

According to an advantage of an alternative single member embodiment of the present invention, the guide rail can have three slots formed therein, wherein each slot has one or more lock holes therethrough. In this regard, the user can select which, if any at all, of the slots can be used with a locking device such as a pin to fix the single member embodiment to a position with respect to the conveyor longitudinal dimension, allowing the other two slots to float with respect to their respective pointing devices.

According to an advantage of an alternative multiple member embodiment of the present invention, each member can be provided with two slots each having a lock hole therethrough. The user can the select locking the member and respective pointing devices at inner slots (relative to the turn) or the end slots (or even no lock at all).

According to an advantage of a further alternative embodiment, a locking bracket and one or more adjustment brackets can be provided and fixed to external sides of the guide rails. This advantageously allows the user to retrofit existing guide rails with adjustability in directions perpendicular to the conveyor surface direction of advancement.

According to another advantage of the present invention, the rail of the present invention could extend into the adjacent straight section or otherwise be integrated into other OEM equipment.

According to a further advantage of the present invention, the rail segments can have various thicknesses to achieve rail heights of desired amounts.

Other advantages, benefits, and features of the present invention will become apparent to those skilled in the art upon reading the detailed description of the invention and studying the drawings.

BRIEF DESCRIPTION OF THE DRAWINGS

FIG. 4 is a perspective view showing the outer guide rail assembly shown in FIG. 1, shown in the widest position.

FIG. 5 is an end view of the outer rail assembly shown in FIG. 4.

DETAILED DESCRIPTION OF PREFERRED EMBODIMENTS

Figure 1:
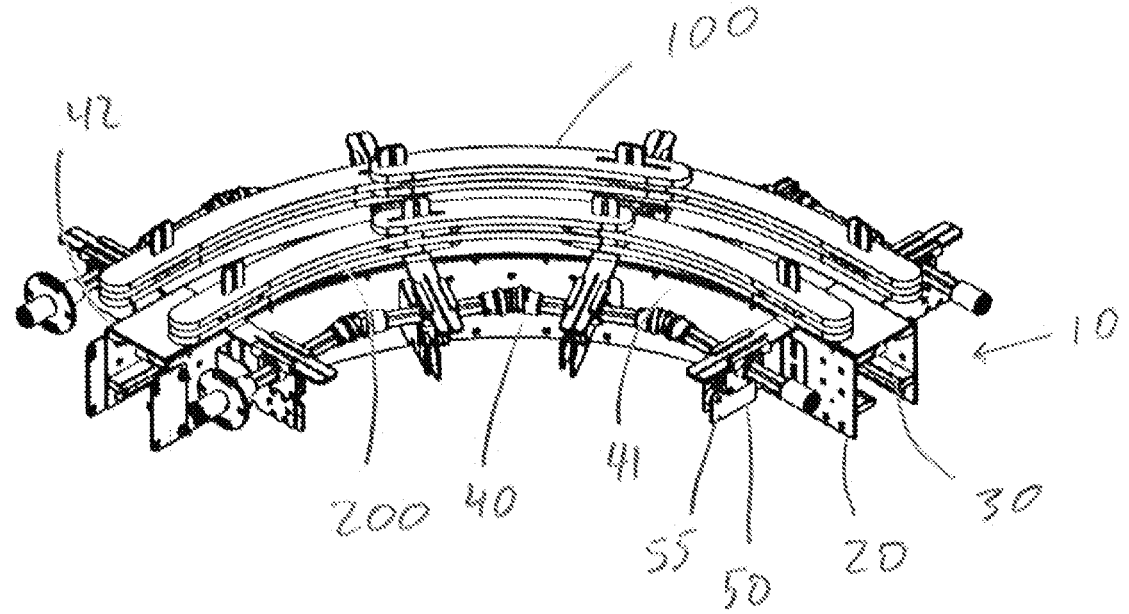
FIG. 1 is a perspective view of a multiple member adjustable guide rail system with inside and outside adjustable rails.
Figure 2:
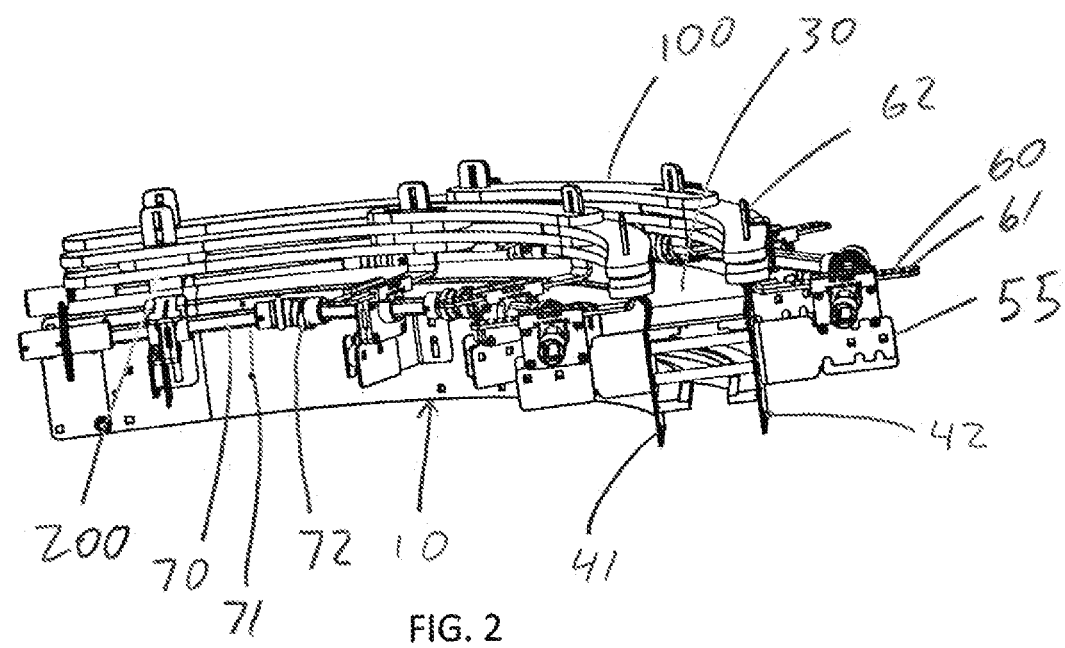
FIG. 2 is an alternative perspective view of the guide rail shown in FIG. 1.
Figure 3:
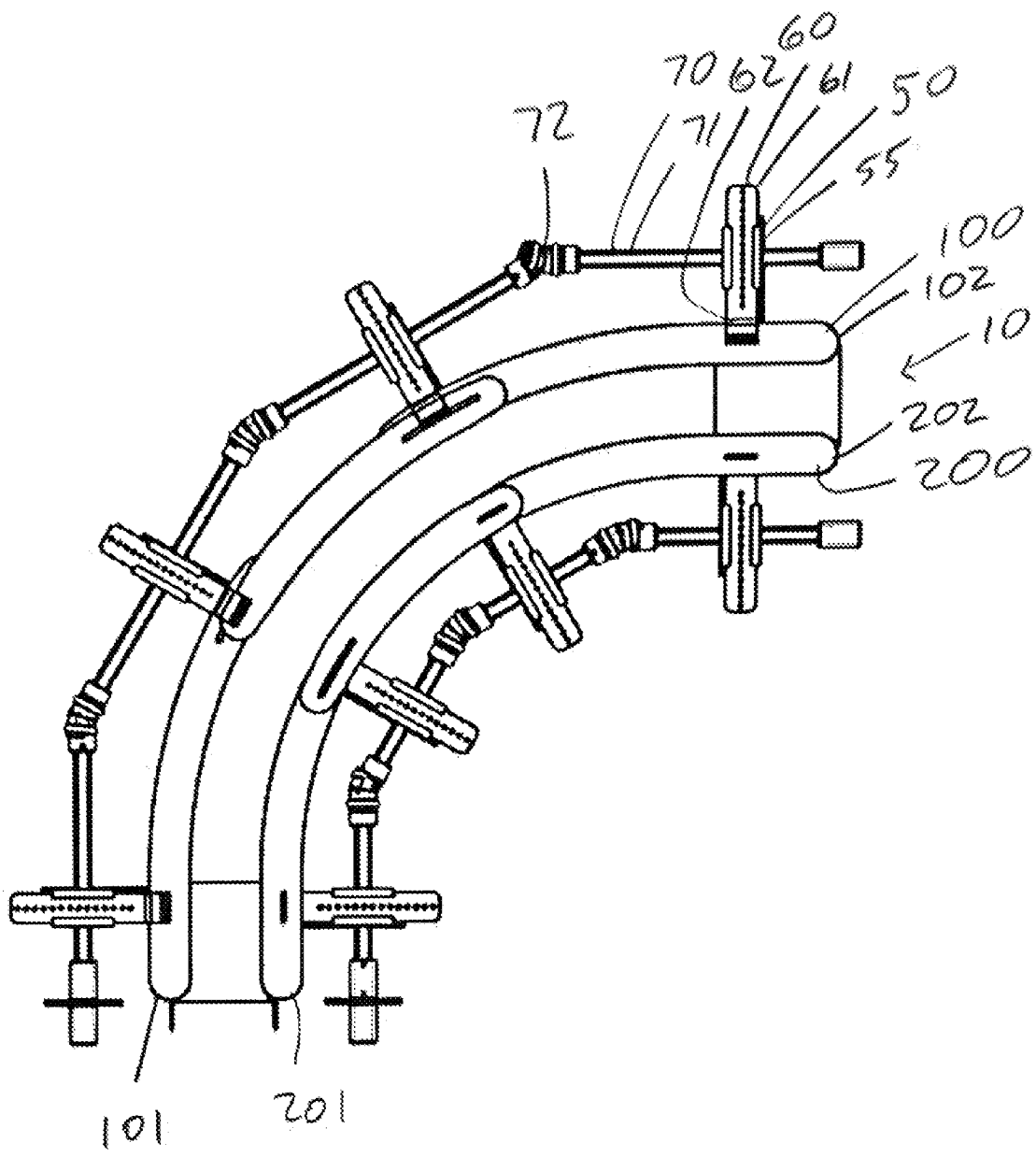
FIG. 3 is a top view of the guide rail shown in FIG. 1.
Figure 6:
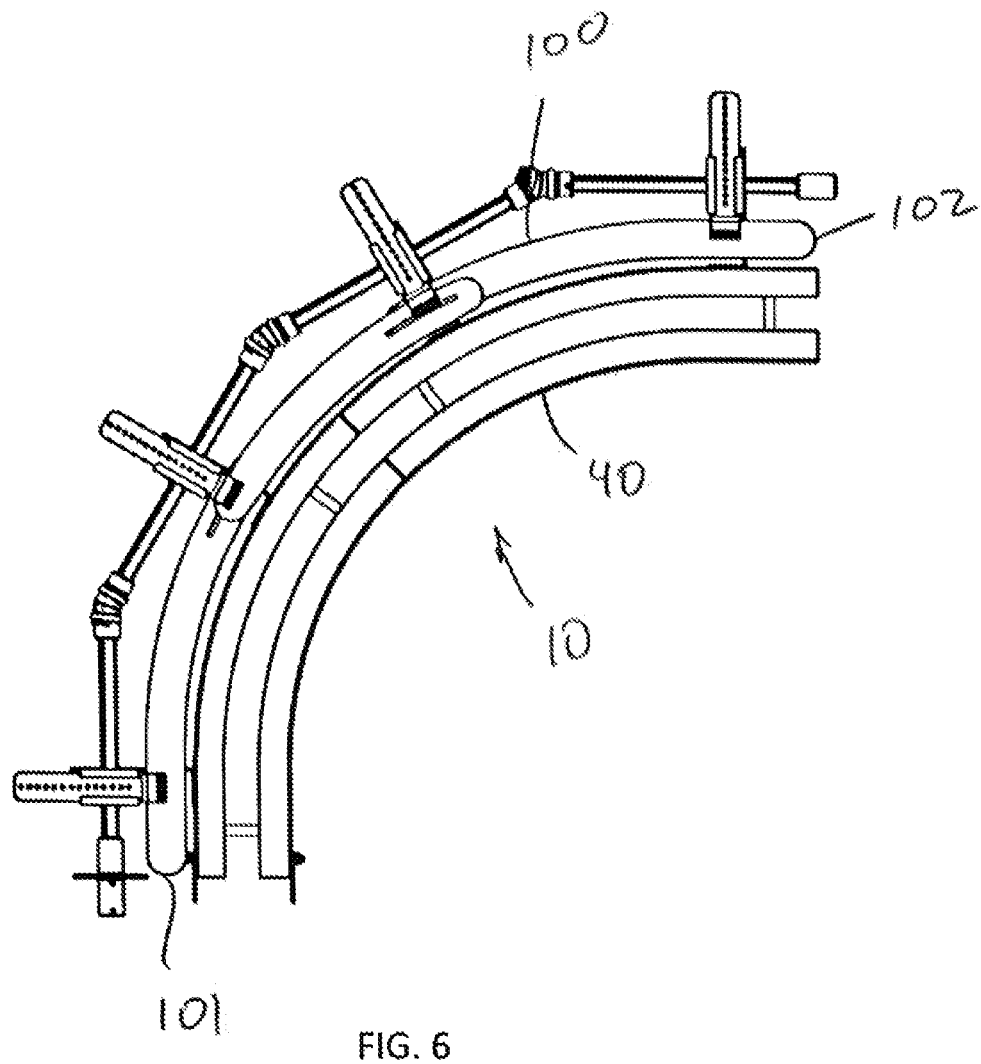
FIG. 6 is a top view of the outer rail assembly shown in FIG. 4.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The various guide rails described herein are useful with a conveyor 10 having a frame 20 supporting a conveying surface 30. The conveyors shown herein are shown for illustrative purposes. The conveyor 10 has a corner or curve 40, having an inside radius 41 and an outside radius 42. An adjustment assembly 50 is provided by way of example. The adjustment assembly 50 has a base 55 and a bracket 60, the bracket 60 having a horizontal adjuster 61 (which is preferably a rack) and a vertical member 62. A drive assembly 70 having rods 71 and U-joints 72 can be provided for driving several adjustment assemblies simultaneously. The adjustment assemblies 50 and drive assemblies 70 can be adjacent both the inside radius 41 and outside radius 42 of the curve 40 depending on whether it is desired to have the inside guide rail, outside guide rail, or both, be adjustable. It is appreciated that the present invention can be used with other types of adjustment assemblies and with (or without if manually adjustable) other types of drive assemblies without departing from the broad aspects of the present invention.

Looking at FIGS. 1-10, it is seen that an embodiment of an outer guide rail 100 is illustrated. The guide rail 100 has a first end 101 and a second end 102. Three guide rails segments 110, 120 and 130 are provided to form the guide rail. Guide rail segment 110 has a position hole 112 at end 111, and an adjustment slot 117 and end 116. Guide rail segment 120 has a position hole 122 at end 121, and an adjustment slot 127 and end 126. Guide rail segment 130 has an adjustment slot 132 at end 131, and position hole 137 and end 136.

Figure 8:
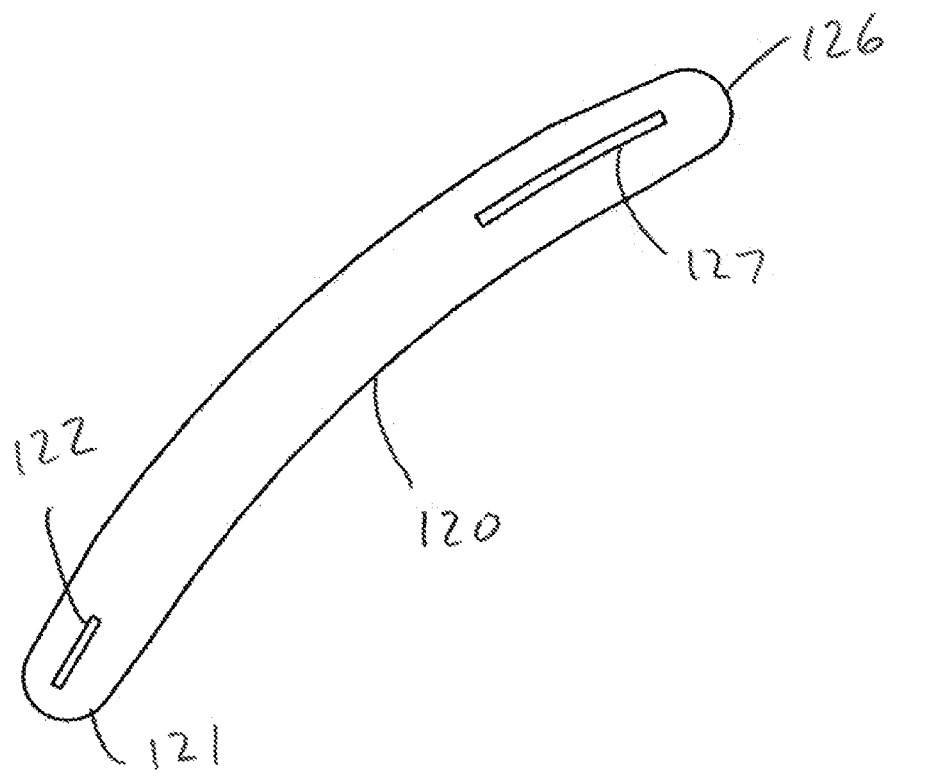
FIG. 8 is an isolation perspective view of a rail segment having an adjustment hole on one end and a slot on the other end.

Segment 120 is shown in isolation in FIG. 8.

Each segment is able to move in and out relative to the conveying surface under operation of adjustment assemblies. In this regard, the bracket vertical members 62 act similarly in the position holes and adjustment slots in directions perpendicular to the conveyor assembly axis. Yet, the adjustment slots and position holes interact with the vertical members 62 differently. In each segment, the position hole is just large enough to receive the vertical member 62 of a bracket 60 in the longitudinal direction of the segment. This means that the longitudinal position of the segment is fixed at the position hole. With respect to the other end of the segment, the vertical member 62 can slide, move or float along the longitudinal direction a distance determined by the slot length (i.e., contact of member 62 with either end of the slot). In a preferred embodiment a member width is approximately 1.5 inch and a slot has a length of approximately 4.5 inches. It is appreciated that these dimension can change on account of the vertical member 62 and the required width adjustment range created by the slot to accommodate the desired adjustment.

Figure 7:
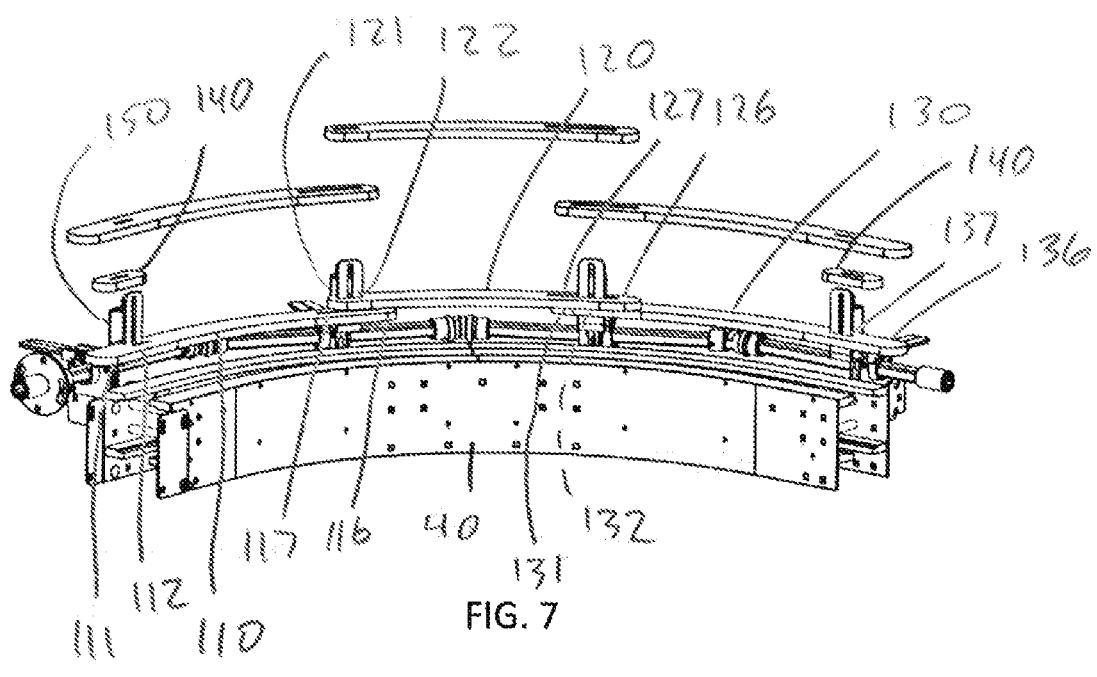
FIG. 7 is an exploded perspective view of the outer rail assembly shown in FIG. 4.
Figure 9:
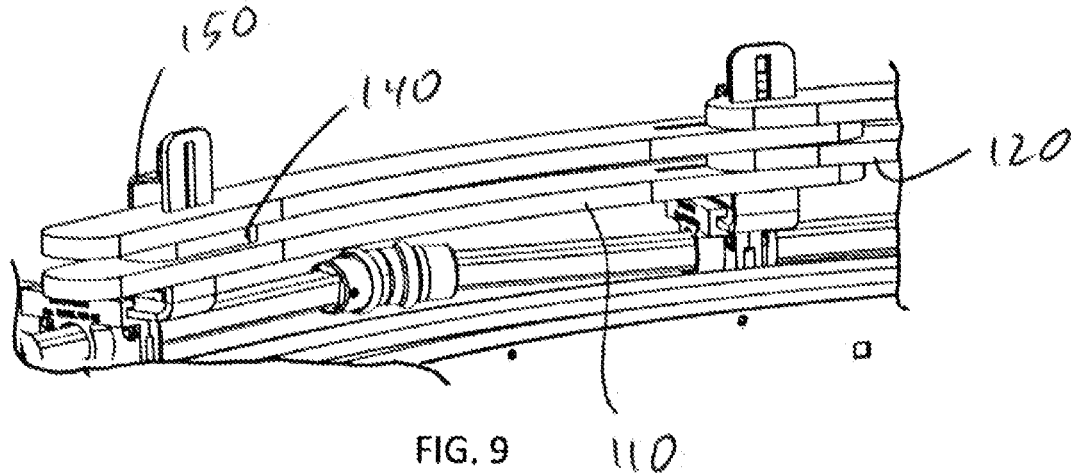
FIG. 9 is a close-up view showing the end of the adjustment assembly of FIG. 4.
Figure 10:
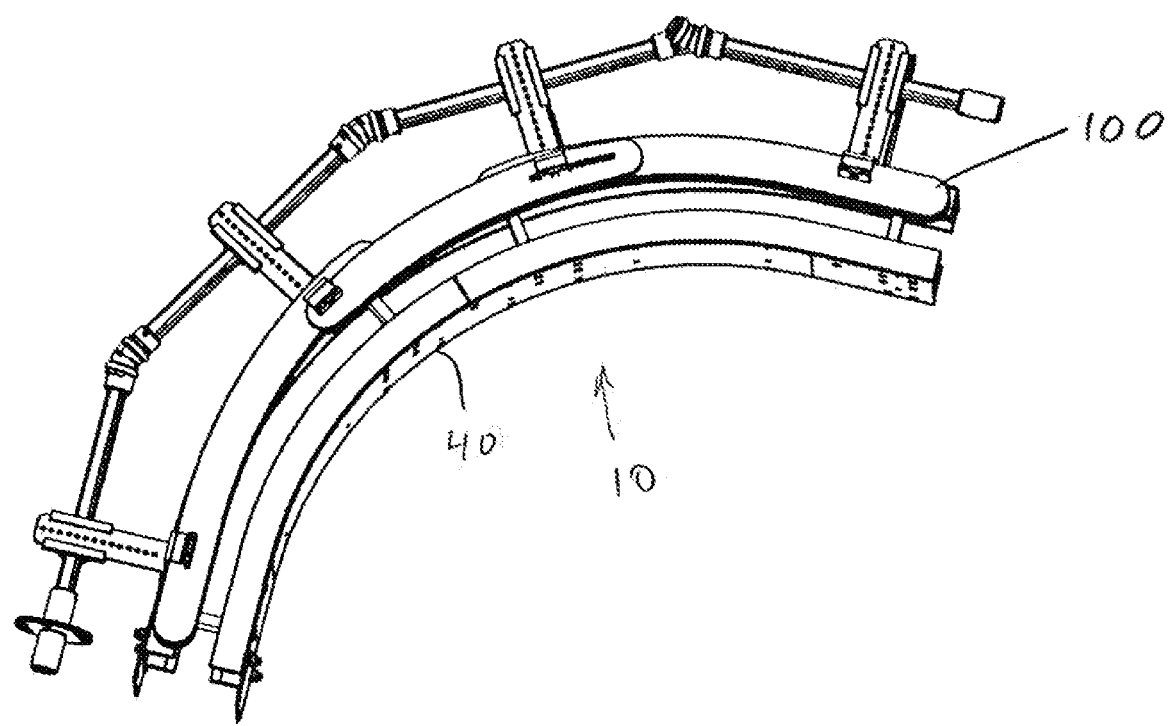
FIG. 10 is similar to FIG. 6 but shows the outer guide rail assembly in the narrowest position.

In one example as shown in FIG. 7, it can be seen that two end segments 110 and 130 can be placed in position first, and the central segment 120 can be positioned second and on top of the two end segments. Multiple layers of each segment can be provided, as determined by the user based on a desired guide rail height. For multiple layer guide rails, it is preferred that spacers 140 are used at the ends 101 and 102 so that the end segments 110 and 130 can be stacked in parallel planes. The spacers 140 can have a height that can be the same as the height of the guide rail segment 120, or alternatively can have a different height (or even different heights for different spacers) to achieve segment spacing as desired. Clips 150 can optionally be used to prevent the stacked segments from being vertically removed from the vertical members 62 of the adjustment assemblies 60. The clips 150 and spacers 140 are illustrated in FIGS. 7 and 9.

It is appreciated that the individual segments are sequentially stacked with the holes/slots being aligned with the respective vertical members.

Turning now to FIGS. 11-16, it is seen that a preferred embodiment of a three-piece inner guide rail 200 is provided. The guide rail 200 has a first end 201 and a second end 202. Three guide rails segments 210, 220 and 230 are provided. Guide rail segment 210 has a position hole 212 at end 211, and an adjustment slot 217 and end 216. Guide rail segment 220 has an adjustment slot 222 at end 221, and a position hole 227 and end 226. Guide rail segment 230 has an adjustment slot 232 at end 231, and a position hole 237 and end 236. There can be multiple layers of segments 210, 220 and 230.

Figure 11:
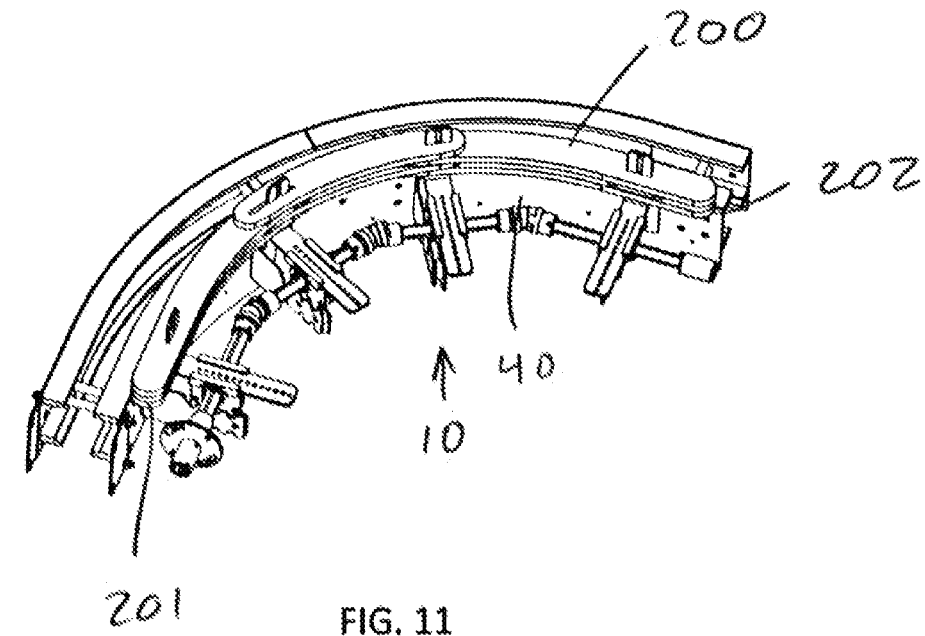
FIG. 11 is a perspective view showing the inner guide rail assembly shown in FIG. 1, shown in the widest position.
Figure 12:
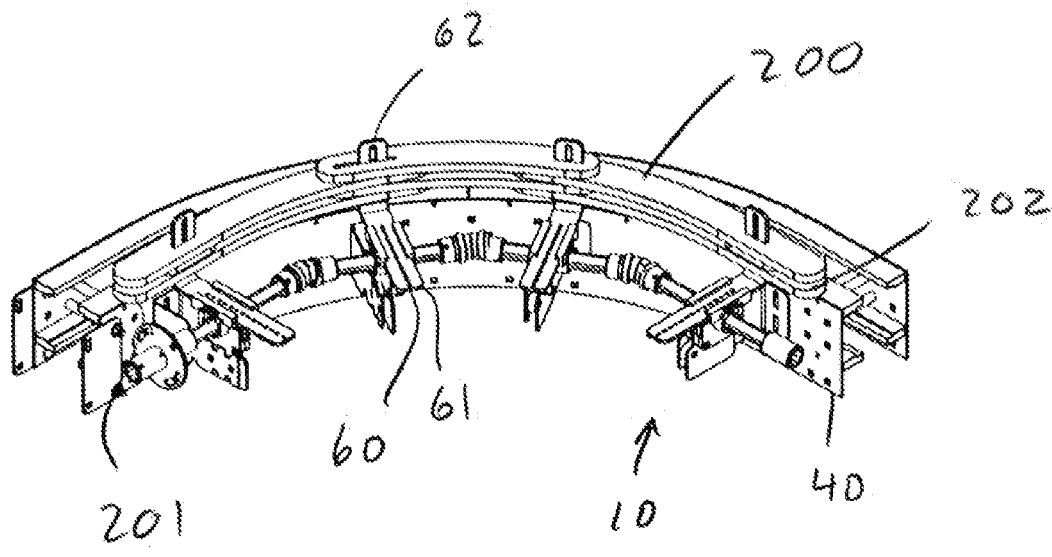
FIG. 12 is an alternative perspective view of the inner guide rail assembly shown in FIG. 11.
Figures 13, 14:
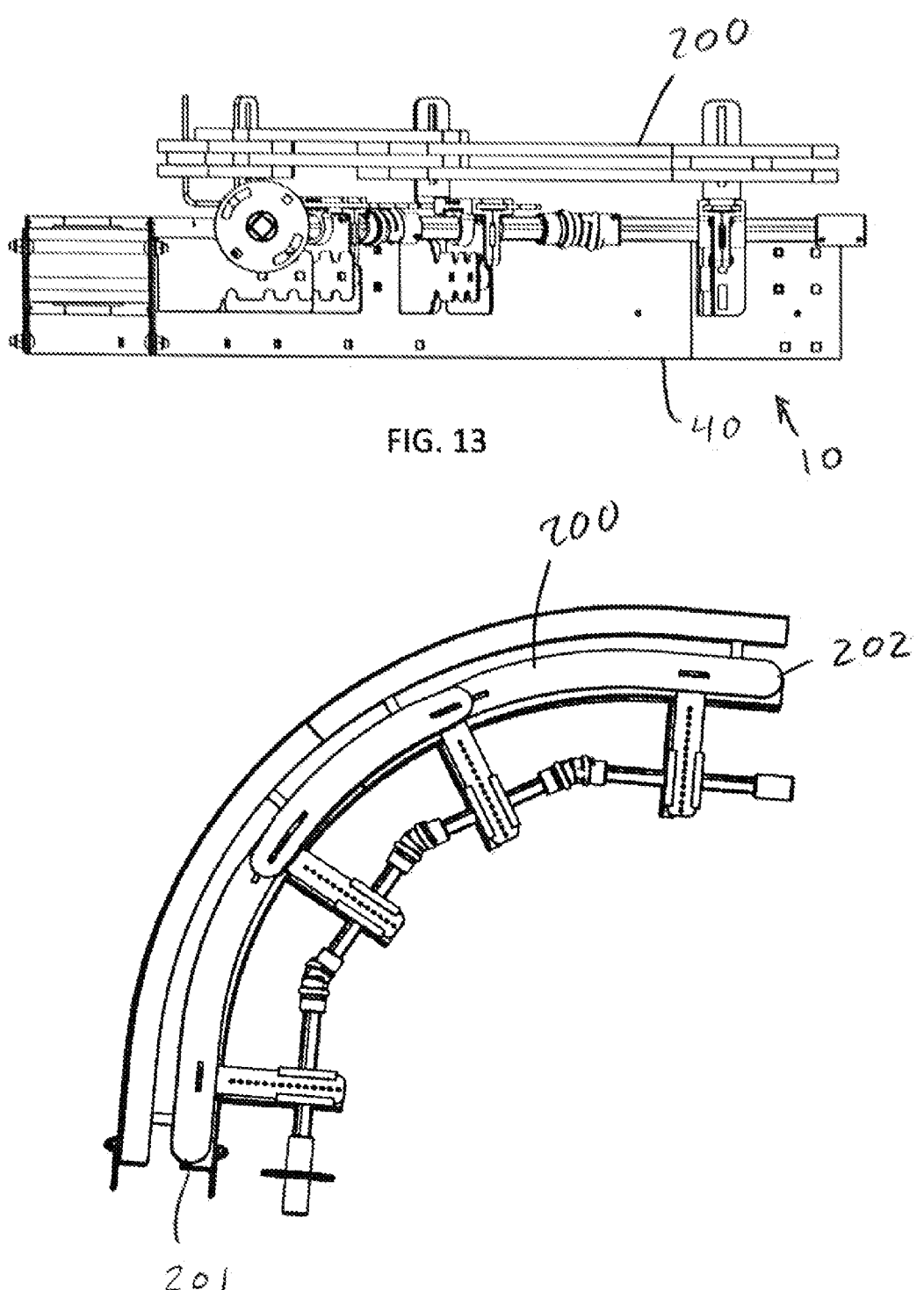
FIG. 13 is an end view of the inner rail assembly shown in FIG. 11.
FIG. 14 is a top view of the inner rail assembly shown in FIG. 11 but is shown in the narrowest position.
Figure 15:
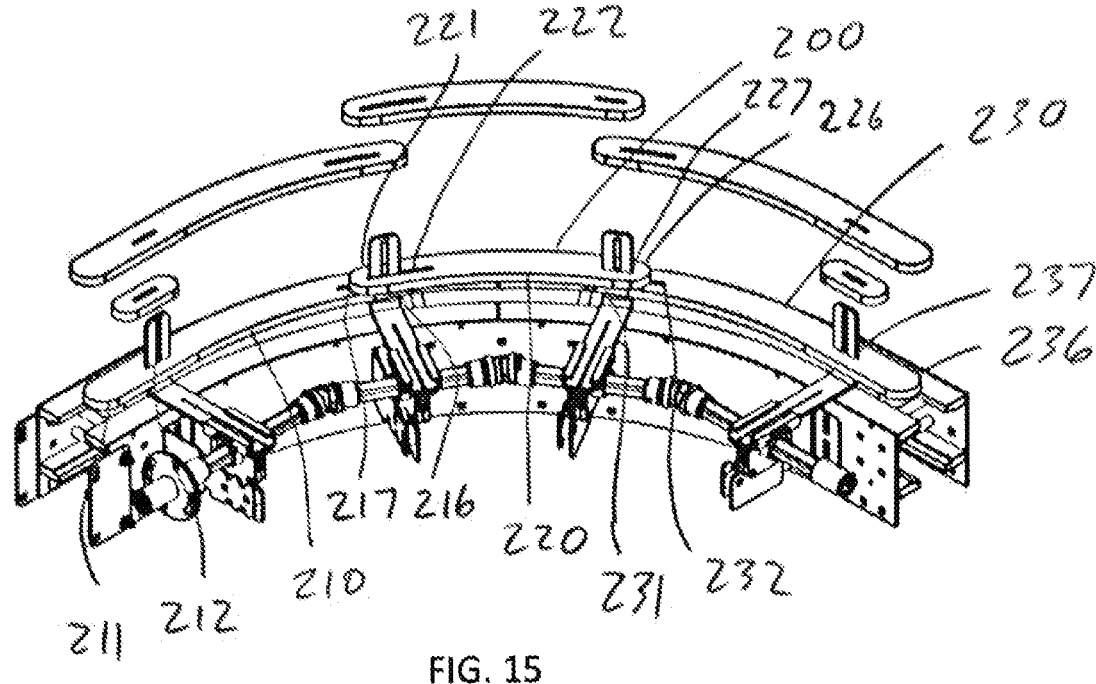
FIG. 15 is an exploded perspective view of the inner rail assembly shown in FIG. 11.
Figure 16:
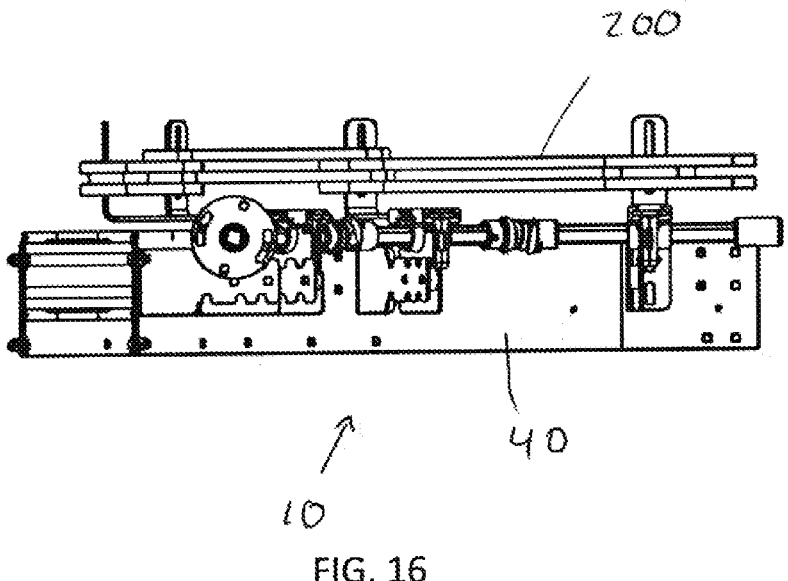
FIG. 16 is an end view of the inner rail assembly shown in the narrowest position.
Figure 17:
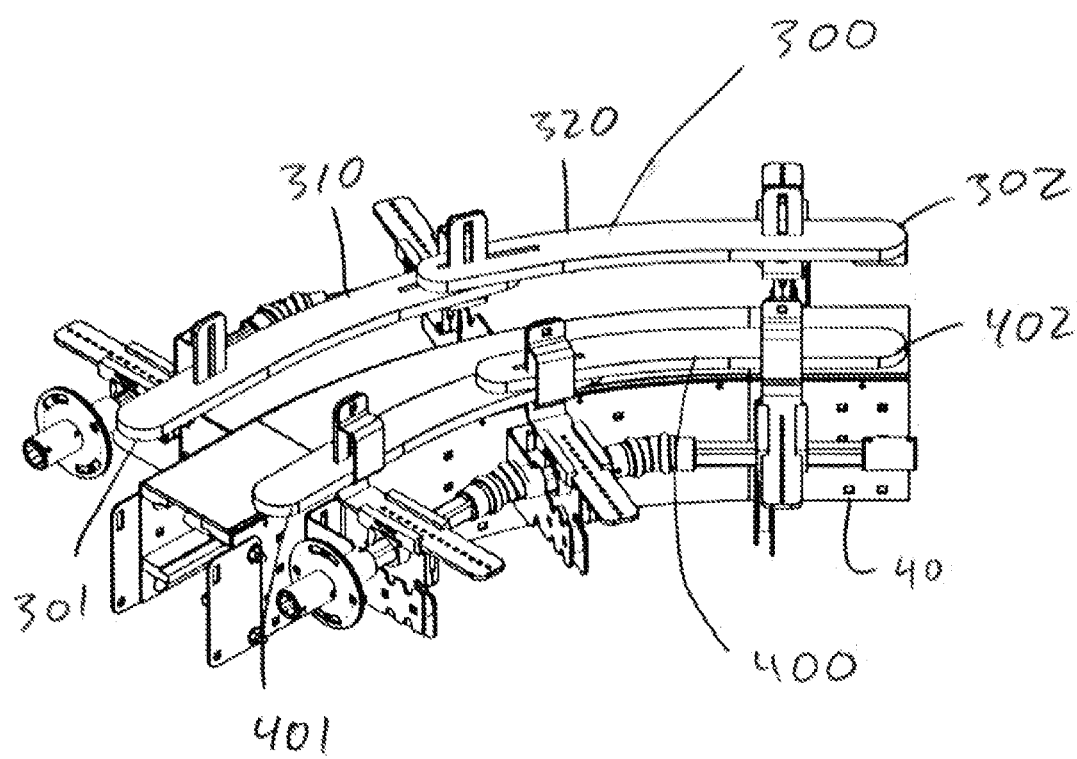
FIG. 17 is a perspective view of a two-segment guide rail assembly showing an inner guide rail assembly and an outer guide rail assembly.
Figure 18:
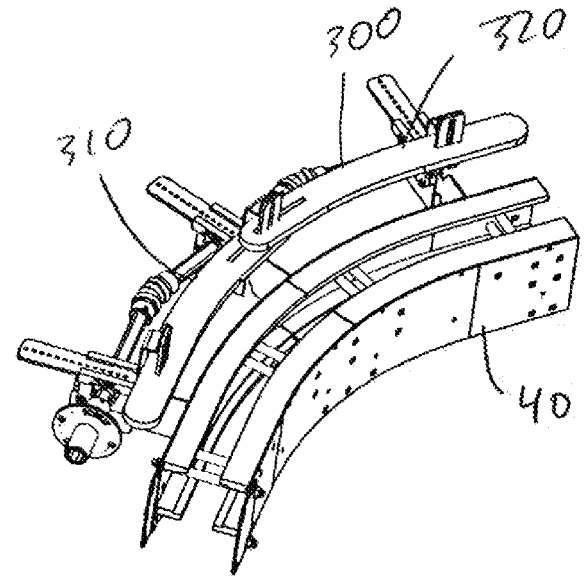
FIG. 18 is a perspective view showing the outer guide rail assembly shown in FIG. 17, shown in the widest position.
Figure 19:
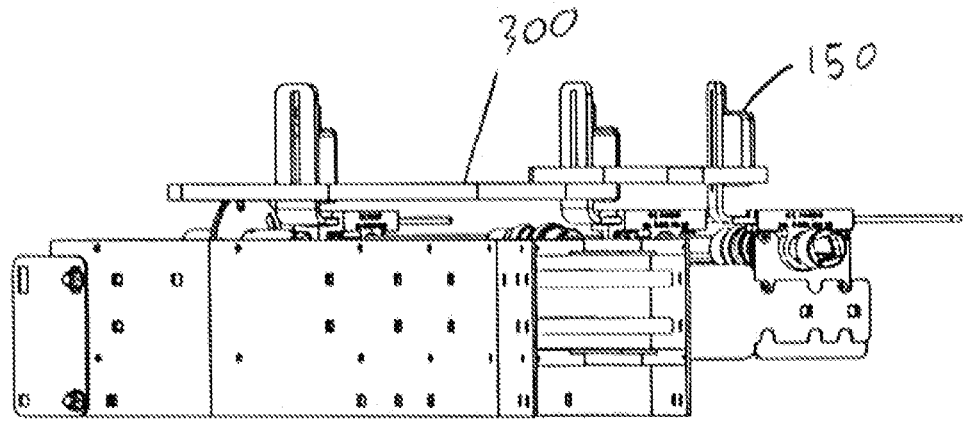
FIG. 19 is a side view of the guide rail assembly shown in FIG. 18.
Figure 20:
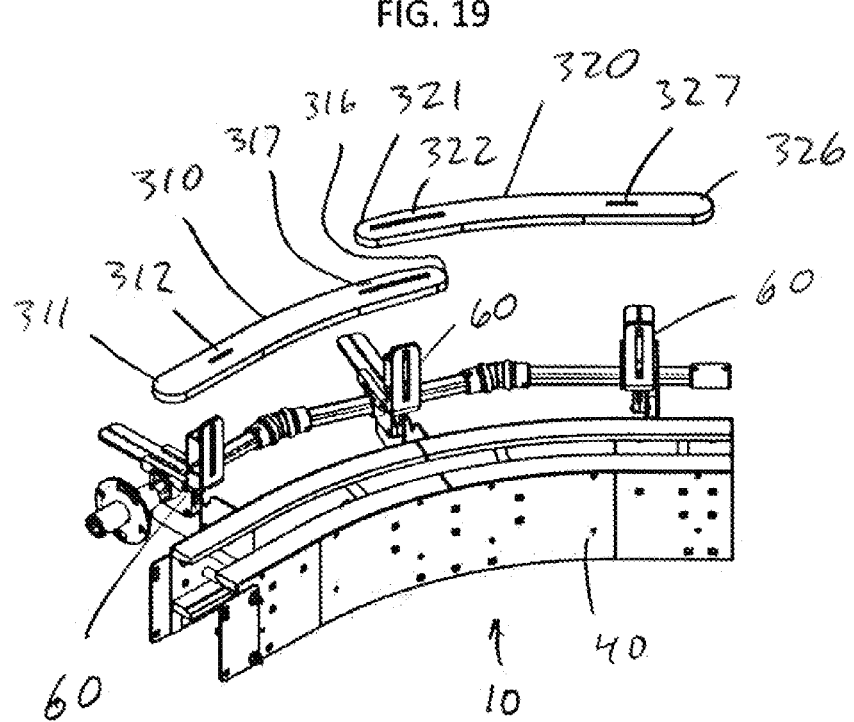
FIG. 20 is an exploded perspective view of the outer rail assembly shown in FIG. 18.
Figure 21:
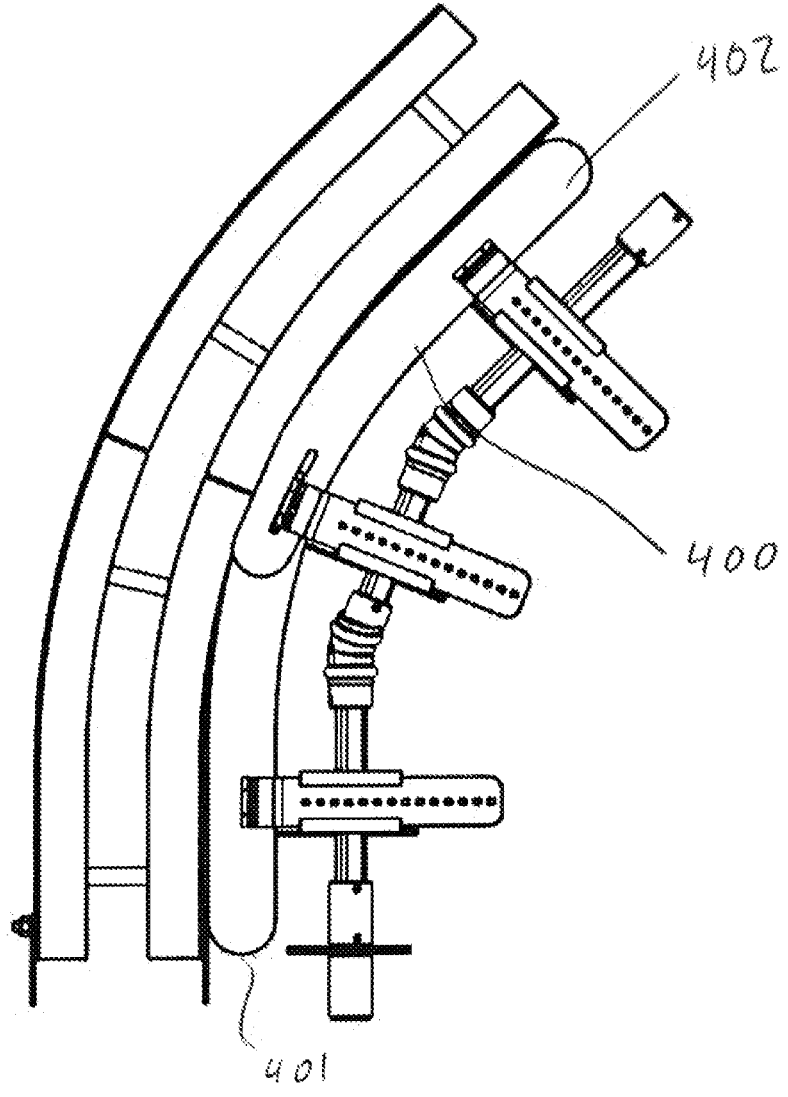
FIG. 21 is a top view showing the inner guide rail assembly shown in FIG. 17, shown in the widest position.
Figures 22, 23:
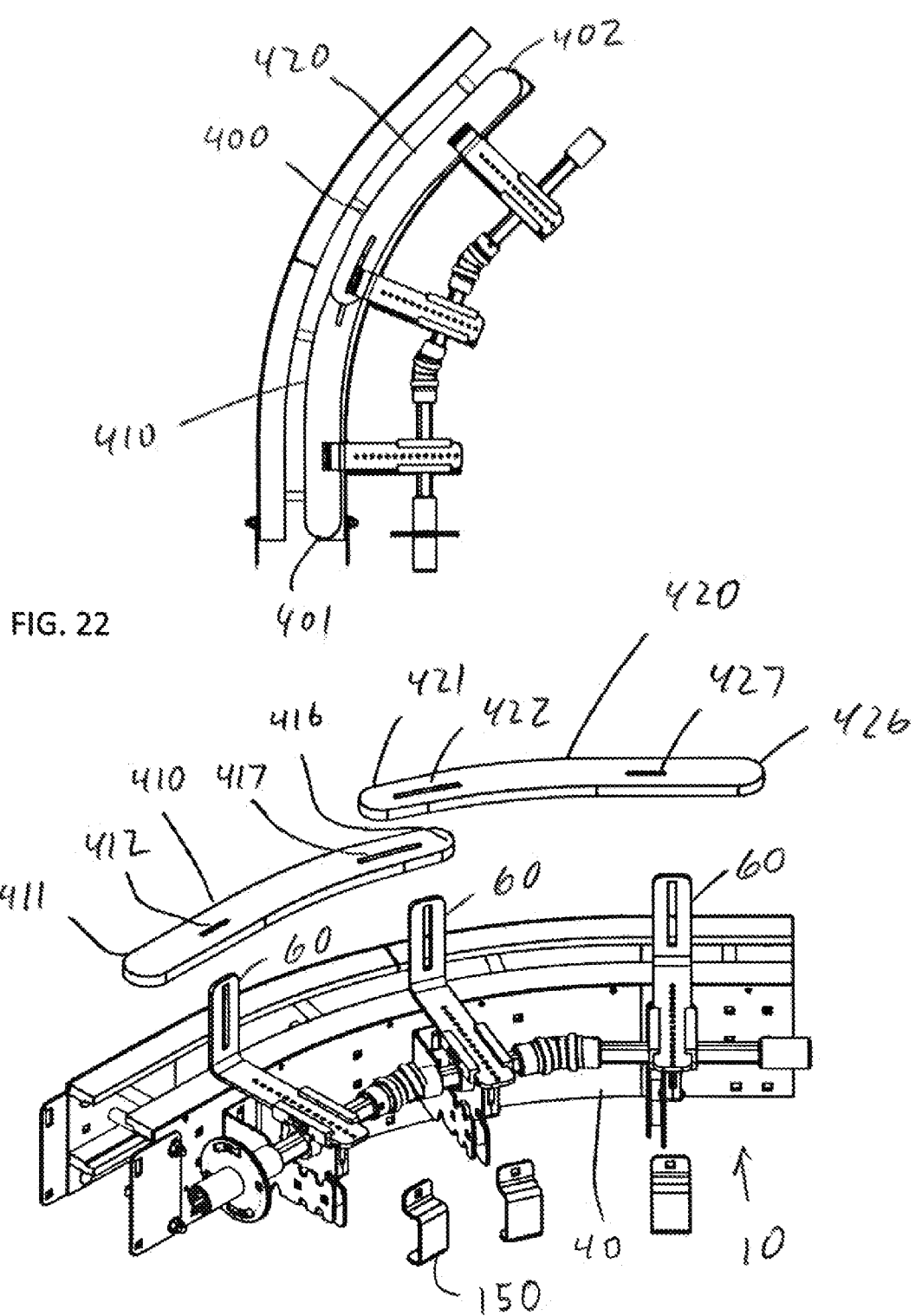
FIG. 22 is similar to FIG. 21 but shows the inner guide rail assembly in the narrowest position.
FIG. 23 is an exploded perspective view of the inner rail assembly shown in FIG. 17.

The inner guide rail assembly 200 is shown in the inner position in FIGS. 14-16, and the outer position in FIGS. 11-12.

The inner guide rail assembly 200 operates similarly to the operation of the outer rail assembly 100. In use, the inner and outer rail assemblies can be used separately or with each other depending on whether the user desires to be able to adjust the inner rail, the outer rail, or both, in a curve.

To illustrate another example of the present invention, a two-piece outer guide rail 300 is illustrated in FIGS. 17-20. The guide rail 300 has a first end 301 and a second end 302. Two guide rails segments 310 and 320 are provided. Guide rail segment 310 has a position hole 312 at end 311, and an adjustment slot 317 and end 316. Guide rail segment 320 has an adjustment slot 322 at end 321, and a position hole 327 and end 326. In this regard, the segments longitudinally are fixed at ends 301 and 302, and longitudinally float relative to each other in the middle of the curve. The guide rail assembly is shown in the outer position in FIG. 18 and the inner position in FIG. 19. The clip 150 can be vertically adjusted under segment 320 so that it can be in a parallel plane with segment 310. Single or multiple layers of segments can be used. Spacers can be used between stacked layers of segments.

A two-piece inner guide rail assembly 400 is illustrated in FIGS. 17 and 21-23. The guide rail assembly 400 has a first end 401 and a second end 402. Two guide rails segments 410 and 420 are provided. Guide rail segment 410 has a position hole 412 at end 411, and an adjustment slot 417 and end 416. Guide rail segment 420 has an adjustment slot 422 at end 421, and a position hole 427 and end 426. In this regard, the segments longitudinally are fixed at ends 401 and 402, and longitudinally float relative to each other in the middle of the curve. The guide rail assembly is shown in the inner position in FIG. 22 and the outer position in FIG. 21. The clip 150 can be vertically adjusted under segment 420 so that it can be in a parallel plane with segment 410. Single or multiple layers of segments can be used. Spacers can be used between stacked layers of segments.

Figure 24:
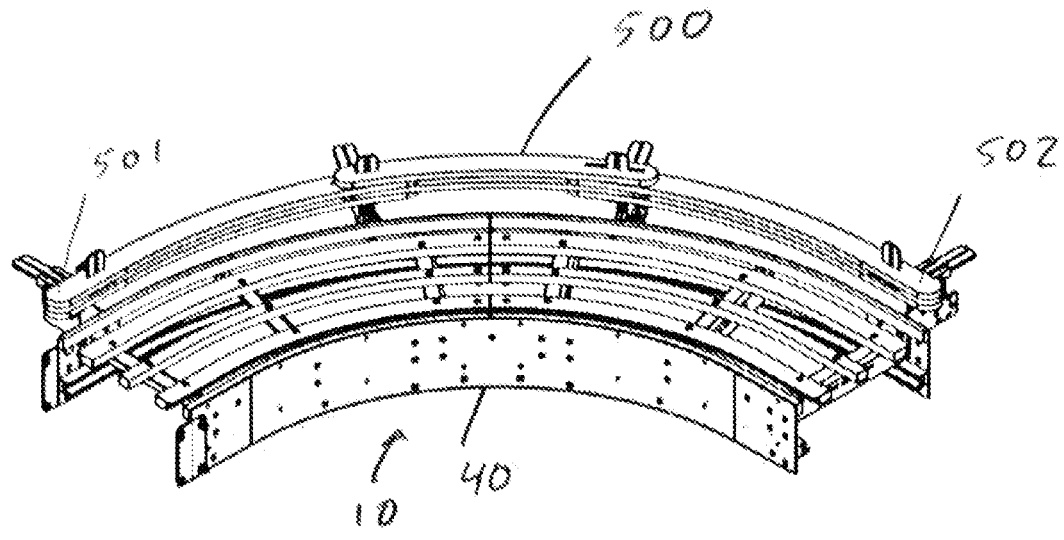
FIG. 24 is a perspective view showing a larger sized outer guide rail assembly in the widest position.
Figure 25:
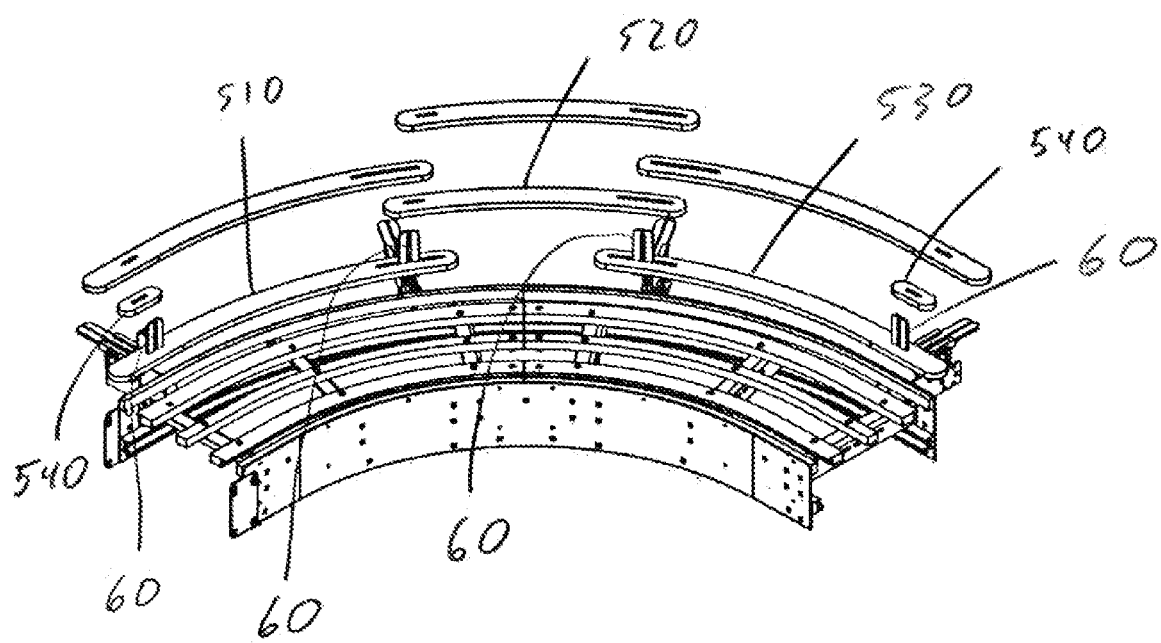
FIG. 25 is a perspective exploded view of the outer guide rail assembly shown in FIG. 24.
Figure 26:
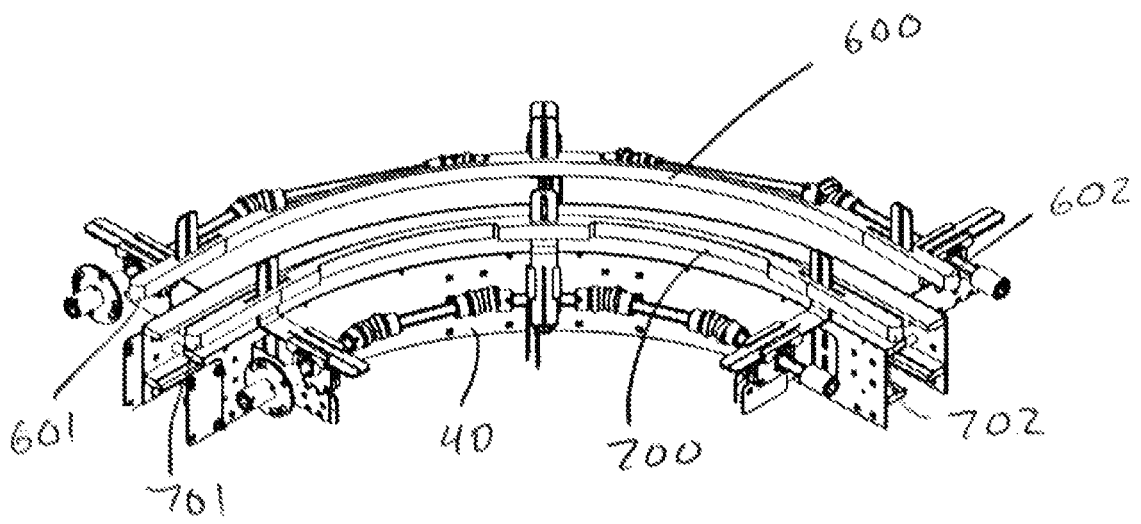
FIG. 26 is a perspective view of a single-segment guide rail showing an inner guide rail and an outer guide rail.
Figure 27:
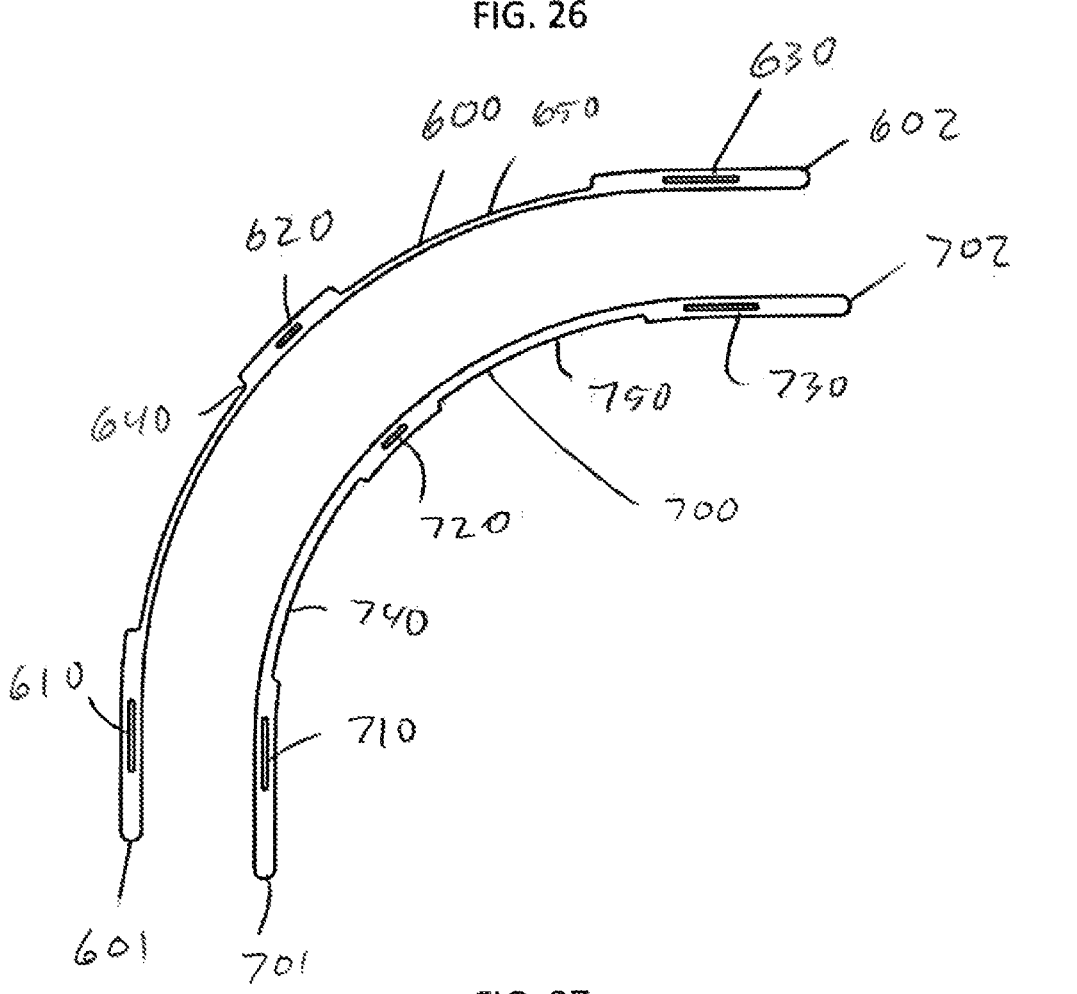
FIG. 27 is a top view showing inner and outer guide rails.
Figure 28:
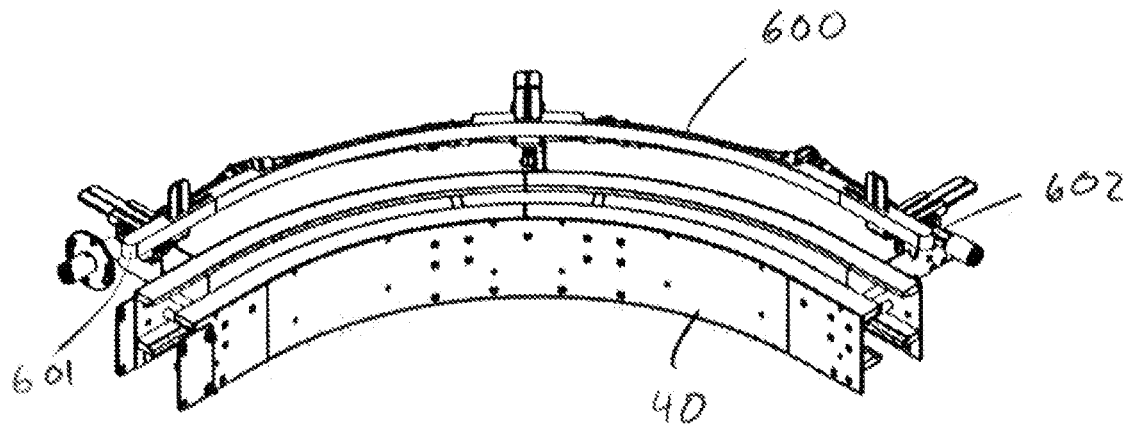
FIG. 28 is s perspective view showing an outer guide rail in a widest position.
Figure 29:
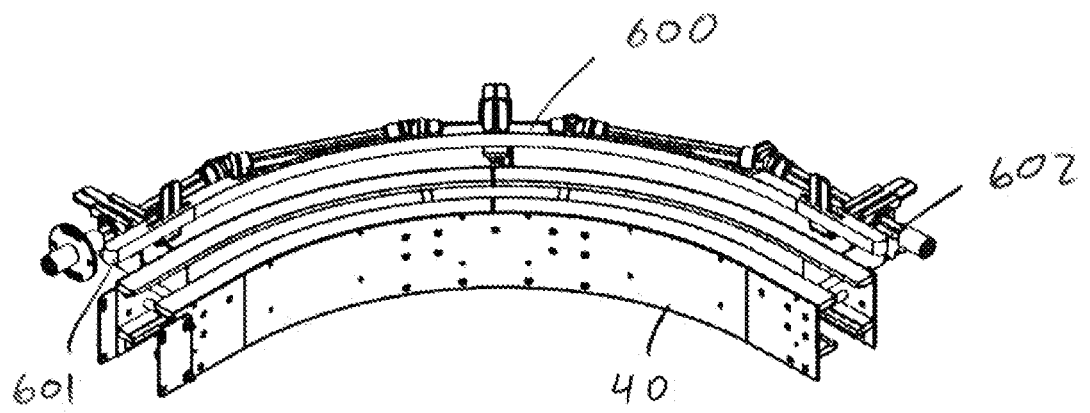
FIG. 29 is similar to FIG. 28 but shows the guide rail in an intermediate position.
Figure 30:
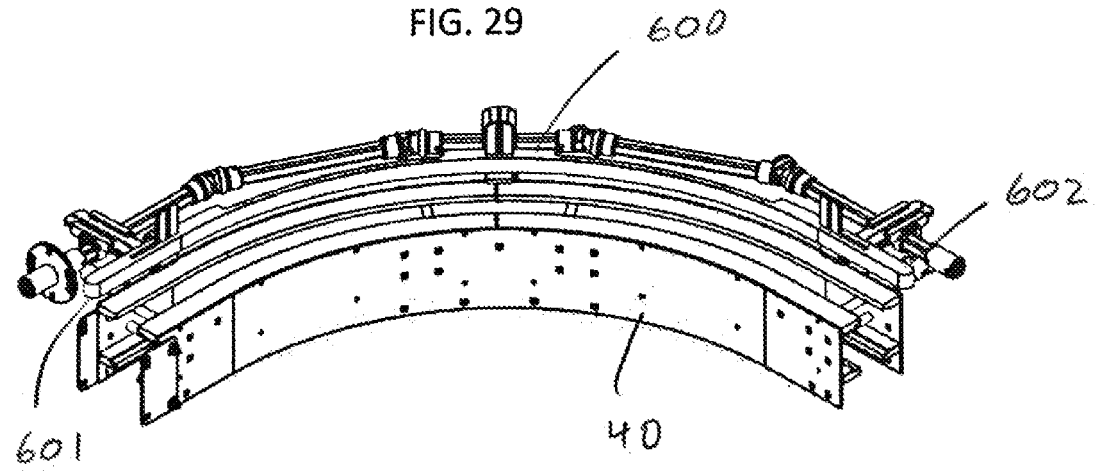
FIG. 30 is similar to FIG. 28 but shows the guide rail in a narrowest position.
Figure 31:
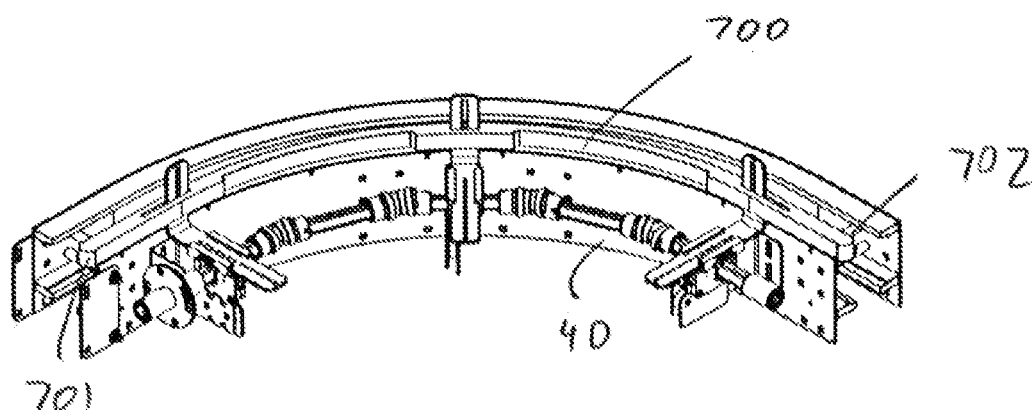
FIG. 31 is s perspective view showing an inner guide rail in a widest position.
Figure 32:
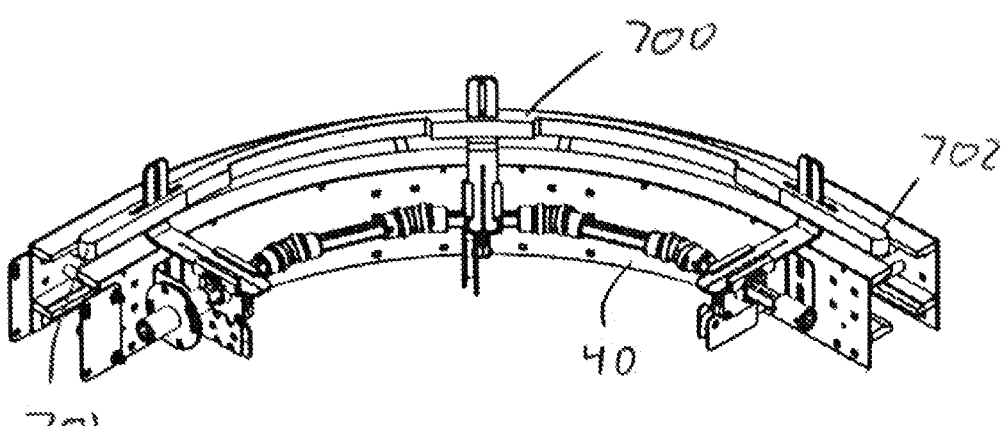
FIG. 32 is similar to FIG. 31 but shows the guide rail in an intermediate position.
Figure 33:
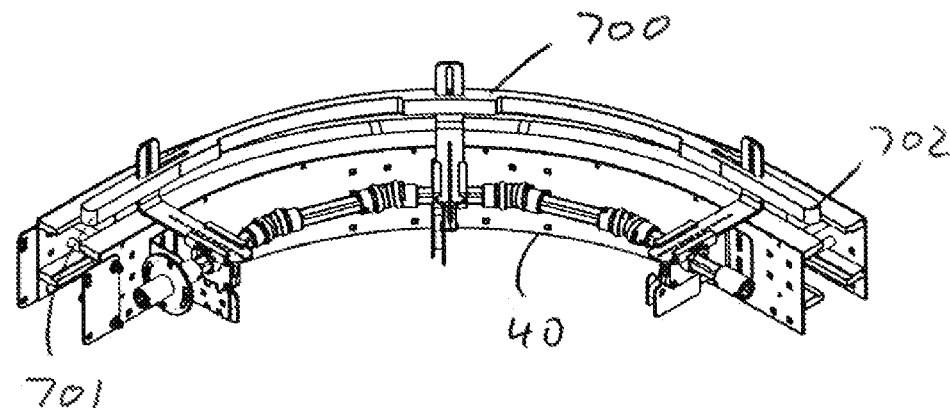
FIG. 33 is similar to FIG. 31 but shows the guide rail in a narrowest position.

It is appreciated that guide rail segments can come is different sizes resulting in different size rails, with different levels of lateral adjustment capacity. A slot length can be increased on a relative basis for multiple reasons, including but not limited to: the width of the conveyor, the adjustment range required (slot length increases proportionally with range), distance between brackets 60 (more brackets means more rail sections which results in relatively shorter slots per segment). A different size of the outer guide rail 500 is illustrated in FIGS. 24-25. The guide rail 500 has a first end 501 and a second end 502, and is comprises of three guide rail segments 510, 520 and 530, respectively. Spacers 540 can be provided. FIG. 24 shows the guide rail in an outer (wide) position. In this position, overall length of the guide rail is longest, and the vertical adjustment members are on one end of the adjustment slots. The guide rail is shortest in overall length when it is in the inner or narrowest position, wherein the vertical members are on the opposite side of the slots. In this regard, the length of the guide rail varies between being longer at the outer position and being shorter at the inner position, as the adjustment devices move within the adjustment slots. It is preferred in this embodiment that position holes are at the ends 501 and 502 of the guide rail 500 so that the assembly is in fixed positions with respect to the conveyor at the ends of the curve. It is understood that other size guide rails, and other overall lateral adjustability capacity can be different that what is illustrated and described herein without departing from the broad aspects of the present invention.

Turning now to FIGS. 26-30, it is seen that an outer guide rail 600 is illustrated. Guide rail 600 is a one-piece guide rail. The guide rail 600 has ends 601 and 602, respectively. An adjustment slot 610 is at end 601. A position hole 620 is preferably at the geometric center of the guide rial 600. A second adjustment slot 630 is at end 602 of the guide rail 600. A relief 640 is between adjustment slot 610 and the position hole 620. A second relief 650 is between the position hole 620 and the second adjustment hole 630. The reliefs 640 and 650 allow the guide rail to be flexible along the longitudinal dimension, so that guide rail can bend to follow the curve and the rail is moved in and out perpendicular to the conveyor surface. The guide rail can have any desired height. It is preferred that the reliefs are formed into the outside surface, wherein the inside surface (facing the conveying surface) is smooth. The guide rail 600 is shown in the widest position in FIG. 28, an intermediate position in FIG. 29, and the narrowest position in FIG. 30.

Turning now to FIGS. 26 and 31-33, it is seen that an inner guide rail 700 is illustrated. Inner guide rail 700 is a one-piece guide rail. The guide rail 700 has ends 701 and 702, respectively. An adjustment slot 710 is at end 701. A position hole 720 is preferably at the geometric center of the guide rial 700. A second adjustment slot 730 is at end 702 of the guide rail 700. A relief 740 is between adjustment slot 710 and the position hole 720. A second relief 750 is between the position hole 720 and the second adjustment hole 730. The reliefs 740 and 750 allow the guide rail to be flexible along the longitudinal dimension, so that guide rail can bend to follow the curve and the rail is moved in and out perpendicular to the conveyor surface. The guide rail can have any desired height. It is preferred that the reliefs are formed into the outside surface, wherein the inside surface (facing the conveying surface) is smooth. The guide rail 700 is shown in the widest position in FIG. 31, an intermediate position in FIG. 32, and the narrowest position in FIG. 33.

Figures 34, 35:
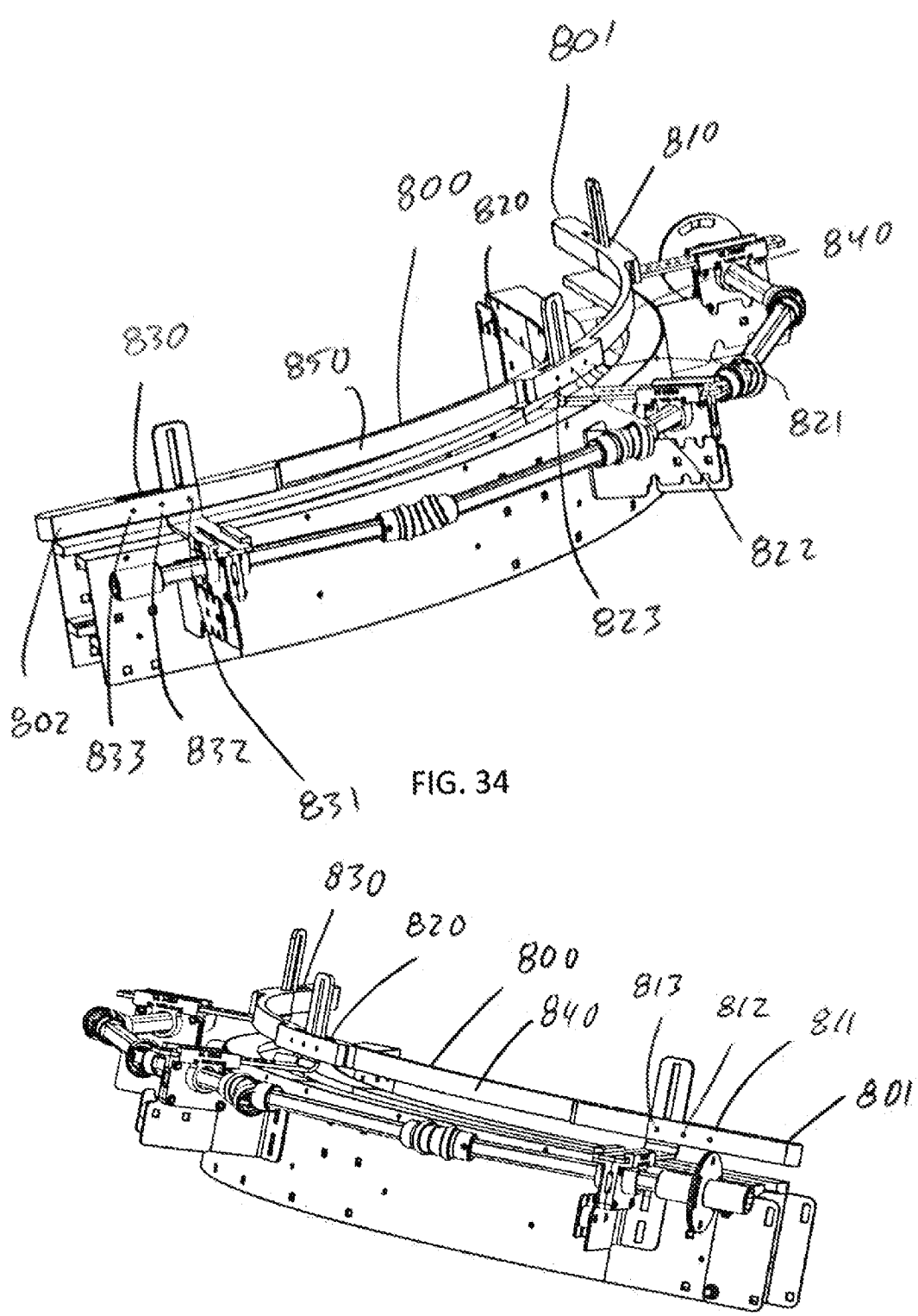
FIG. 34 is a perspective view of an alternative outer guide rail having lock holes.
FIG. 35 is an alternative perspective view of the guide rail shown in FIG. 34.
Figures 36, 37:
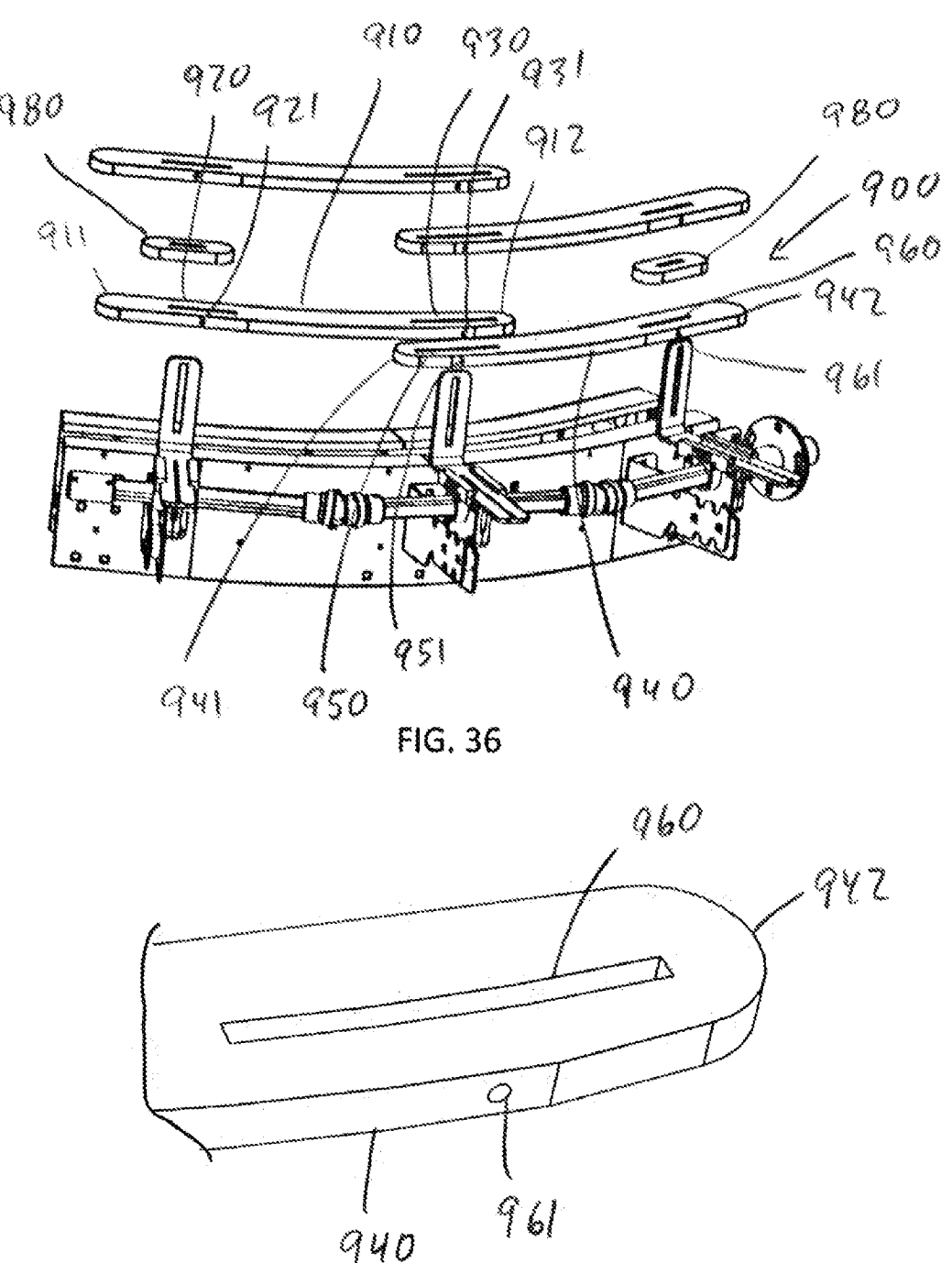
FIG. 36 is an exploded view showing a two-member outer guide rail assembly having lock holes.
FIG. 37 is a close-up end view of a guide rail member.
Figure 38:
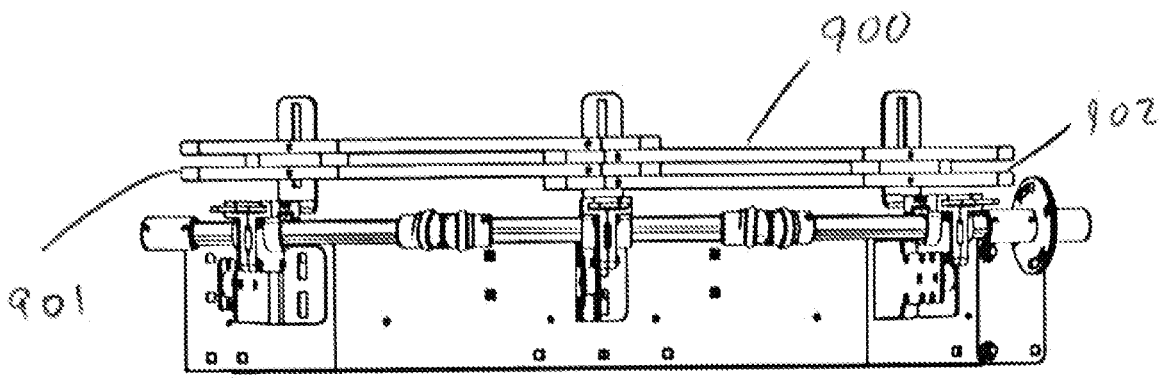
FIG. 38 is a rear perspective view of the two-segment outer guide rail assembly of FIG. 36 showing vertical members being locked in the outer slots.
Figure 39:
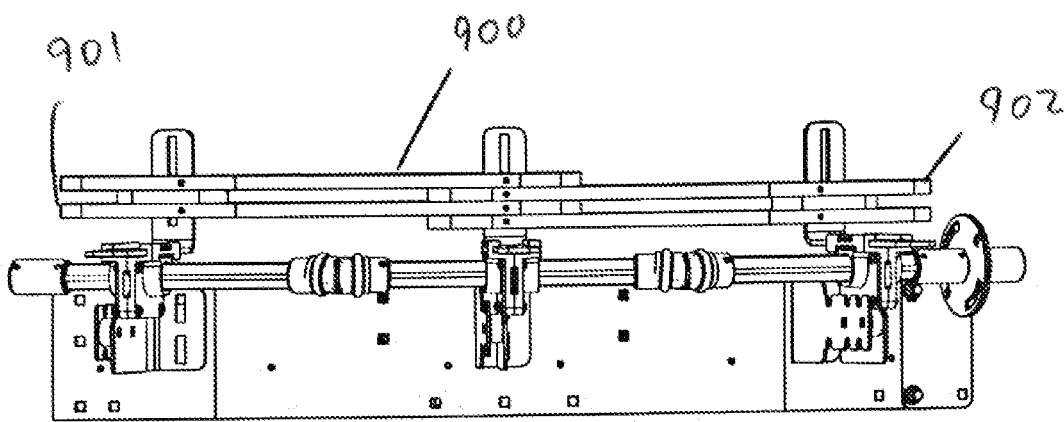
FIG. 39 is a rear perspective view of the two-segment outer guide rail assembly of FIG. 36 showing a vertical member being locked in the inner slots.

Turning now to FIGS. 34-35, it is seen that an outer guide rail 800 is illustrated. Guide rail 800 is a one-piece guide rail. The guide rail 800 has ends 801 and 802, respectively. An adjustment slot 810 is at end 801. An adjustment slot 820 is preferably at the geometric center of the guide rial 800. A third adjustment slot 830 is at end 802 of the guide rail 800. Reliefs 840 and 850 are between adjustment slots 810, 820 and 830, respectively. The reliefs 840 and 850 allow the guide rail to be flexible along the longitudinal dimension, so that guide rail can bend to follow the curve and the rail is moved in and out perpendicular to the conveyor surface. The guide rail can have any desired height. It is preferred that the reliefs are formed into the outside surface, wherein the inside surface (facing the conveying surface) is smooth. Slot 810 has three lock holes 811, 812 and 813, respectively therethrough. Slot 820 has three lock holes 821, 822 and

823, respectively therethrough. Slot 830 has three lock holes 831, 832 and 833, respectively therethrough. It is appreciated that any one lock hole can receive a lock (not shown) to hold the guide rail in a fixed position relative to an adjuster. The single lock can be an end slot or the middle slot. If an end slot, it is preferred that the outer (closest to the guide rail end) lock hole is used. If the middle slot receives the lock, the middle lock hole is preferably used.

Figure 40:
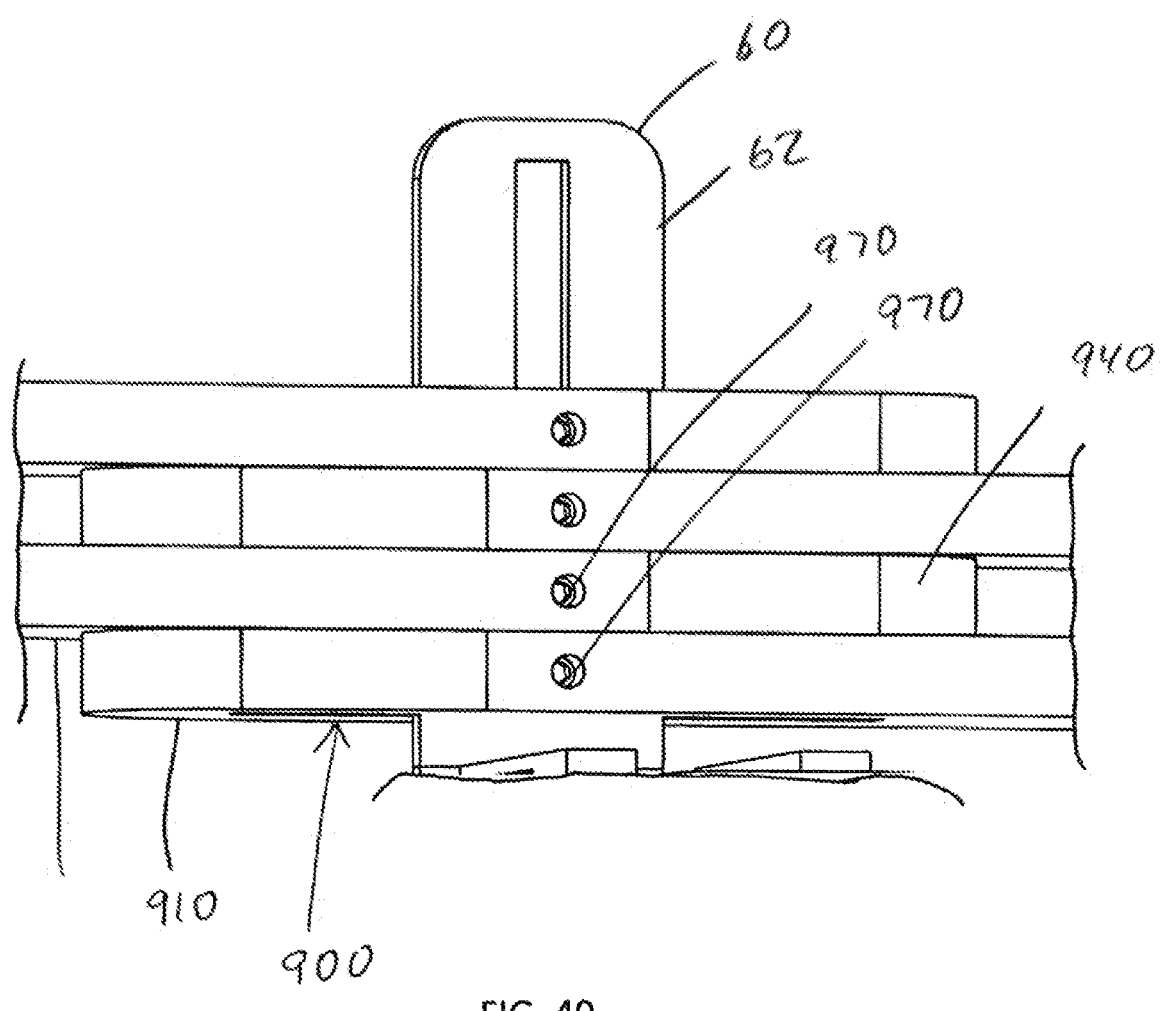
FIG. 40 is a close-up perspective view of a portion of FIG. 39.

Turning now to FIGS. 36-42, it is seen that another example of the present invention is illustrated. A guide rail 900 has a first end 901 and a second end 902. Two guide rails segments 910 and 920 are provided. Guide rail segment 910 has ends 911 and 912, a first adjustment slot 920 with a central lock hole 921, and a second slot 930 with a central lock hole 931. Guide rail segment 940 has ends 941 and 942, a first adjustment slot 950 with a central lock hole 951, and a second slot 960 with a central lock hole 961. Any segment can be locked at one end by inserting a lock 970 through a desired lock hole to fix particular segment in position with respect to the adjustment assembly. Spacers 980 can be provided to keep segments parallel to each other. In FIG. 40, is can be seen that the opposite ends of sequentially layered segments can be locked in the middle of a curve.

Figure 41:
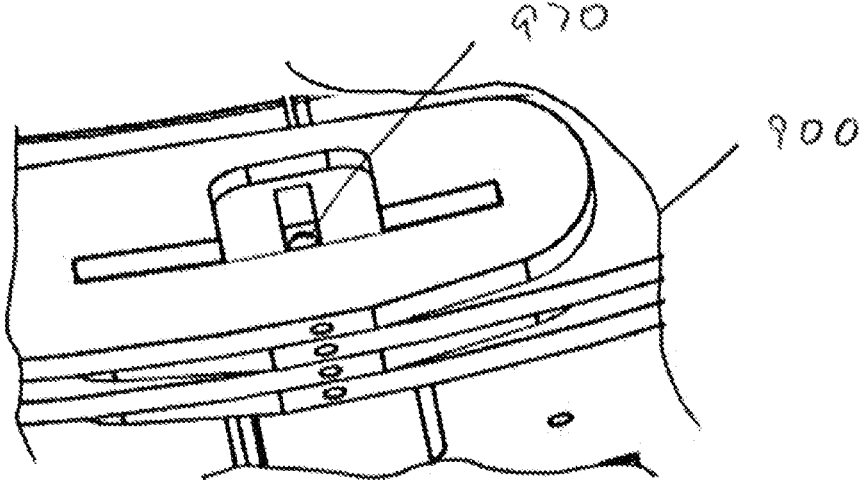
FIG. 41 is a close-up perspective view showing a lock extending into a slot.
Figure 42:
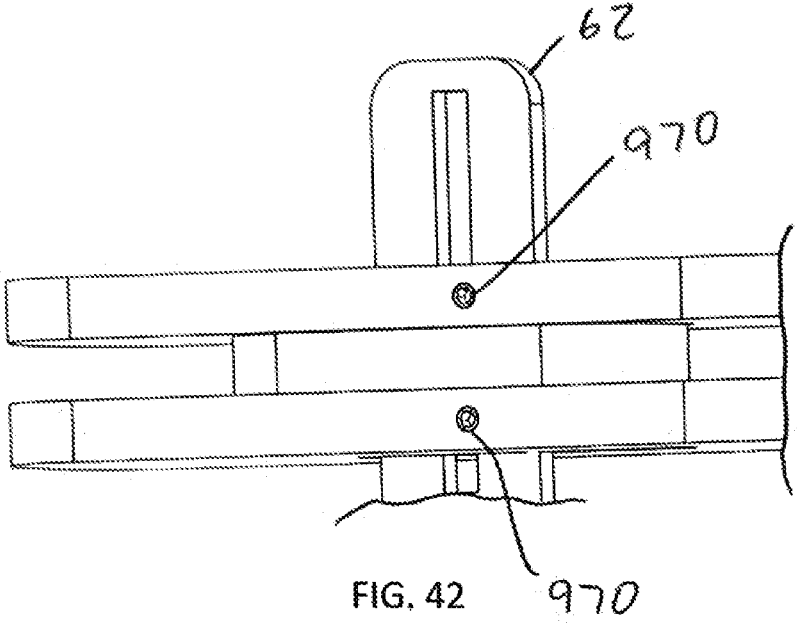
FIG. 42 shows a lock in an unlocked position.
Figure 43:
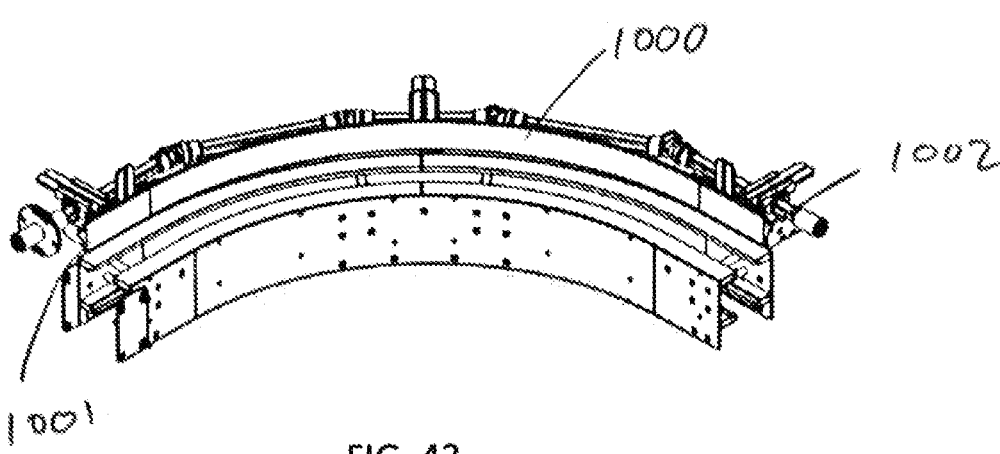
FIG. 43 is a perspective view of an alternative outer guide rail.
Figure 44:
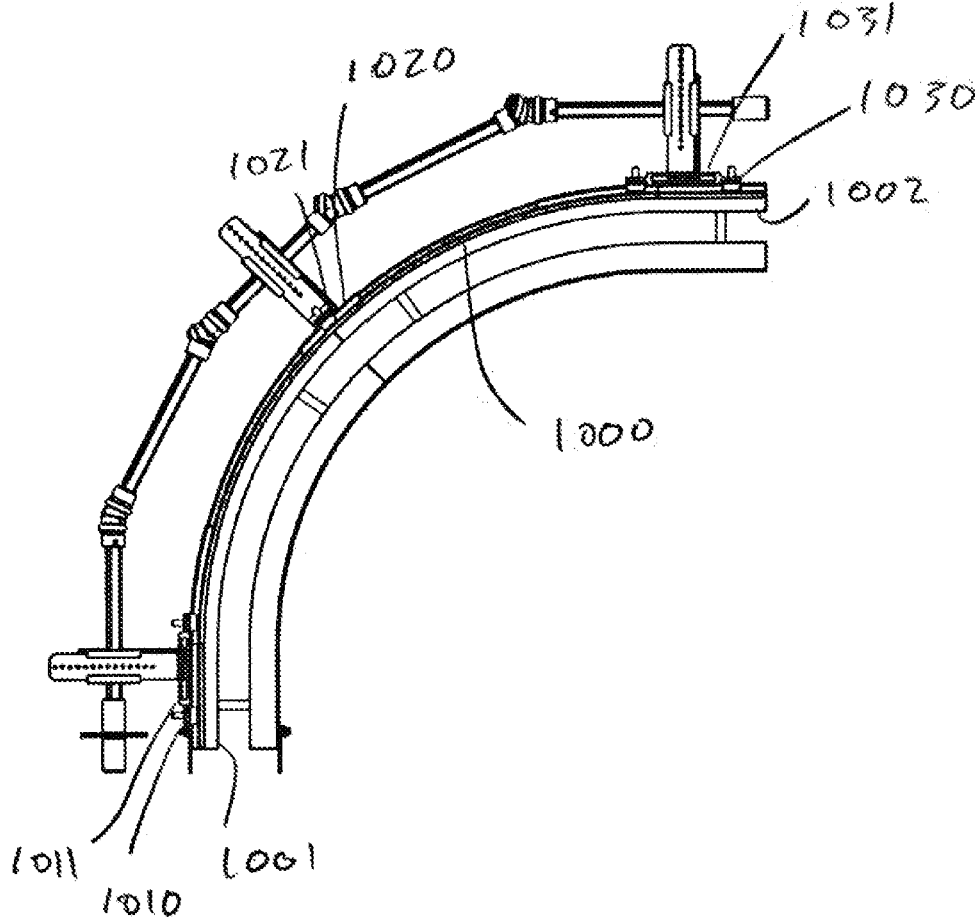
FIG. 44 is top view of the outer guide rail shown in FIG. 43.
Figure 45:
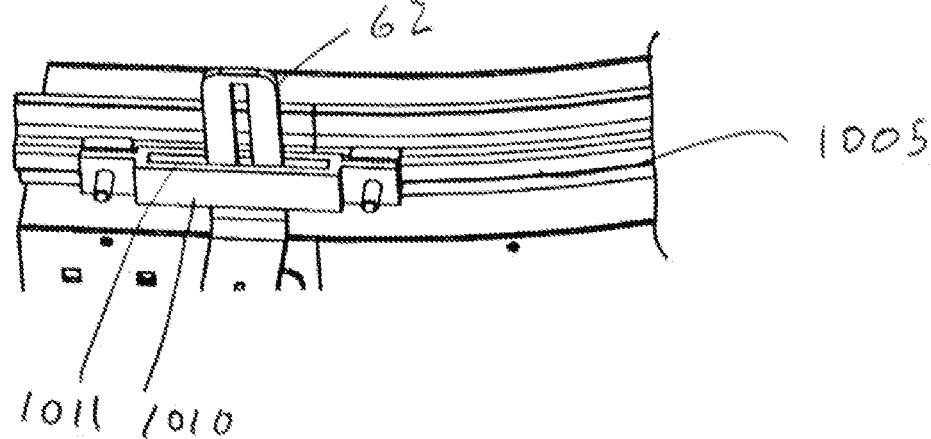
FIG. 45 is a close-up perspective view of an adjustment bracket with a slot fastened to the guide rail.
Figure 46:
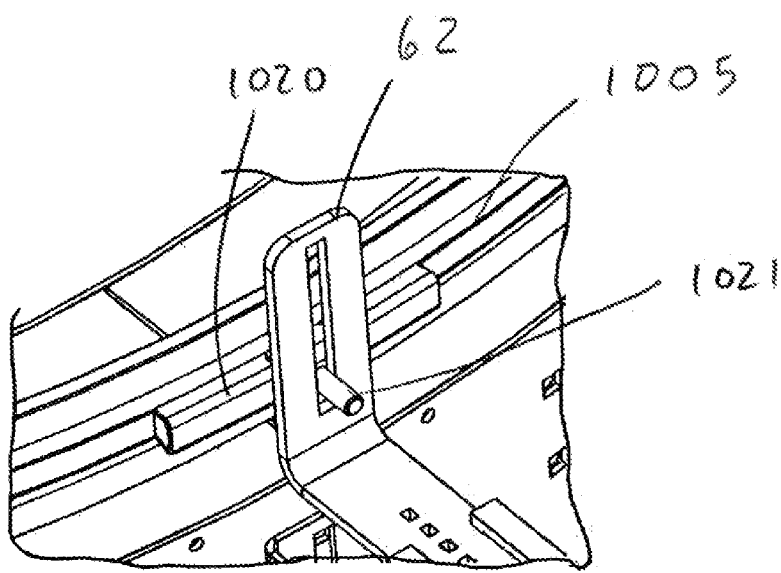
FIG. 46 is a close-up perspective view of a locking bracket with a lock pin.

The lock, which is preferably a fastener such as a screw, can be used to fix the segment in position by turning the fastener through the segment and into the bracket slot (FIGS. 40 and 41). The member is not fixed to the bracket when the lock is turned out so that the fastener does not protrude beyond the side face of the segment (FIG. 42).

Turning now to FIGS. 43-46, it is seen that another example of a guide rail 1000 is illustrated. The guide rail 1000 has ends 1001 and 1002. A mounting rail 1005 is connected to or is formed into the back side of the guide rail 1000. An adjustment bracket 1010 can be connected to end 1001 of the guide rail 1000. The adjustment bracket 1010 has a slot 1011 formed therethrough. A second adjustment bracket 1030 is provided and can be connected to end 1002 of the guide rail 1000. The adjustment bracket 1030 has a slot 1031 formed therethrough. The adjustment brackets 1010 and 1030 can be locked in position with respect to the back of the guide rail 1000. A locking bracket 1020 can be connected to the mounting rail 1005 between the adjustment brackets 1010 and 1030. The locking bracket locks that portion of the rail with respect to the longitudinal direction of the conveyor surface. It is appreciated that the locking bracket could be in a different position, or even switch positions with one of the adjustment brackets, without departing from the broad aspects of the present invention.

Figure 47:
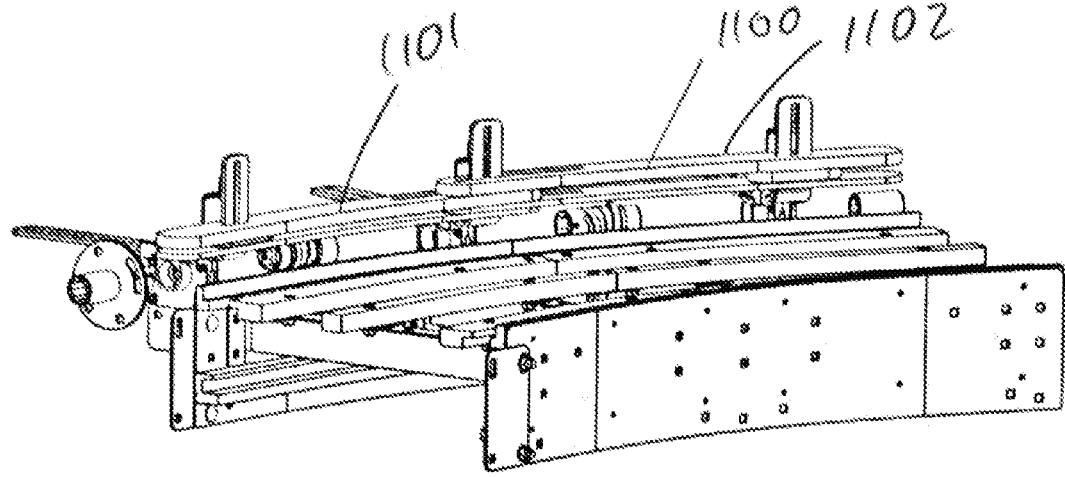
FIG. 47. is a perspective view showing a guide rail assembly having segments having varying thicknesses so that the overall assembly has a desired height.

FIG. 47 is a perspective view showing a guide rail assembly 1100 having segments 1101 and 1102 having a varying respective thicknesses so that the overall assembly has a desired height.

Figure 48:
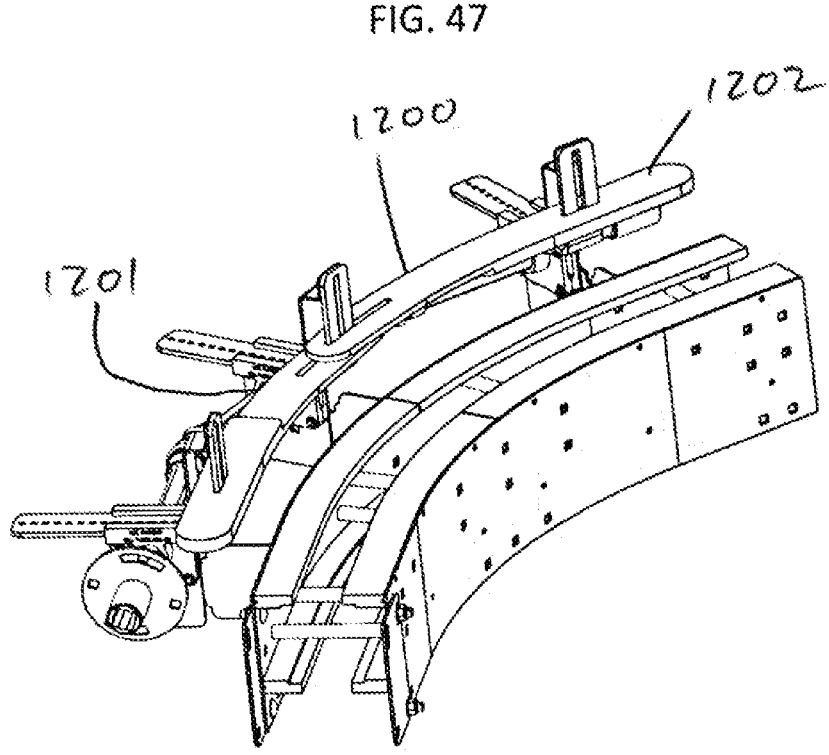
FIG. 48 is a perspective view showing a guide rail assembly having segments each having a varying thickness at one end so that the overall assembly has a uniform height

FIG. 48 is a perspective view showing a guide rail assembly 1200 having segments 1201 and 1202 each having a varying thickness at one end so that the overall assembly has a uniform height.

It is appreciated that some segments could float at both ends in a situation where controlling the location of one end is not desired.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

A guide rail for a conveyor having a conveying surface and a curve, said guide rail comprising: a first end; a second end; a first guide rail segment having a first guide rail segment positioning hole at said first end and a first guide rail segment adjustment slot; and a second guide rail segment having a second guide rail segment positioning hole at said second end and a second guide rail segment adjustment slot.

A guide rail for a conveyor having a conveying surface, a curve and an adjustment assembly with a first bracket, a second bracket, a third bracket and a fourth bracket, said guide rail comprising: a first end; a second end; a first guide rail segment having a first guide rail segment positioning hole at said first end and a first guide rail segment adjustment slot said first segment positioning hole being receiving said first bracket and said first guide rail segment adjustment slot receiving said second bracket; a second guide rail segment having a second guide rail segment positioning hole and a second guide rail segment adjustment slot, said second guide rail segment positioning hole receiving said second bracket and said second guide rail segment adjusting slot receiving said third bracket; and a third guide rail segment having a third guide rail segment positioning hole at said second end and a third guide rail segment adjustment slot, said third guide rail segment adjustment slot receiving said third bracket and said third guide rail positioning hole receiving said fourth bracket.

A guide rail for a conveyor having a conveying surface, a curve and an adjustment assembly with a first bracket, a second bracket and a third bracket, said guide rail comprising: a first end; a second end; a first guide rail segment having a first guide rail segment first slot and a first guide rail segment second slot; and a second guide rail segment having a second guide rail segment first slot and a second guide rail segment second slot, wherein: the first bracket is received through said first guide rail segment first slot; the second bracket is received through said first guide rail segment second slot and said second guide rail segment first slot; the third bracket is received through said second guide rail segment second slot; said first guide rail segment is selectably lockable with respect to one of the first bracket or second bracket; and said second guide rail segment is selectably lockable with respect to one of the second bracket or third bracket.

Each of these structures can also be combined with each other and/or with one or more of the following features, if not already recited above: having multiple stacks of guide rail segments, having multiple spacers, having more than three guide rail segments, having both inside and outside guide rail assemblies working simultaneously.

A guide rail for a conveyor having a conveying surface, a curve and an adjustment assembly with a first bracket, a second bracket, and a third bracket, said guide rail comprising: a first end; a second end; a first adjustment slot; a second adjustment slot; and a position hole, wherein the first bracket is movably received through said first adjustment slot, the second bracket is stationarily received through said position hole and the third bracket is movably received through said second adjustment slot.

A guide rail for a conveyor having a conveying surface, a curve and an adjustment assembly with a first bracket, a second bracket, and a third bracket, said guide rail comprising: a first end; a second end; a first adjustment slot; a second adjustment slot; and a third adjustment slot, wherein: the first bracket is received through said first adjustment slot, the second bracket is received through said second slot and the third bracket is received through said third adjustment slot; and one of the first bracket, the second bracket or third bracket can be locked in place with respect to said guide rail.

Each of these structures can also be combined with each other and/or with one or more of the following features, if not already recited above: having multiple stacks of guide rail segments, having multiple spacers, having more than three guide rail segments, having both inside and outside guide rail assemblies working simultaneously.

Thus, it is apparent that there has been provided, in accordance with the invention, a adjustable conveyor guide rail that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A guide rail for a conveyor having a conveying surface and a curve, said guide rail comprising:
   a first end;
   a second end;
   a first guide rail segment having a first guide rail segment positioning hole at said first end and a first guide rail segment adjustment slot, the first guide rail segment positioning hole and the first guide rail segment adjustment slot passing vertically through the first guide rail segment; and
   a second guide rail segment having a second guide rail segment positioning hole at said second end and a second guide rail segment adjustment slot, the second guide rail segment positioning hole and the second guide rail segment adjustment slot passing vertically through the second guide rail segment.

2. The guide rail of claim 1 further comprising a spacer, said spacer being at said first end under said first guide rail segment.

3. The guide rail of claim 1 wherein said first guide rail segment adjustment slot is in overlapping alignment with said second guide rail segment adjustment slot.

4. A guide rail for a conveyor having a conveying surface, a curve and an adjustment assembly with a first bracket, a second bracket, a third bracket and a fourth bracket, said guide rail comprising:
   a first end;
   a second end;
   a first guide rail segment having a first guide rail segment positioning hole at said first end and a first guide rail segment adjustment slot, said first segment positioning hole receiving said first bracket and said first guide rail segment adjustment slot receiving said second bracket;
   a second guide rail segment having a second guide rail segment positioning hole and a second guide rail segment adjustment slot, said second guide rail segment positioning hole receiving said second bracket and said second guide rail segment adjusting slot receiving said third bracket; and
   a third guide rail segment having a third guide rail segment positioning hole at said second end and a third guide rail segment adjustment slot, said third guide rail segment adjustment slot receiving said third bracket and said third guide rail positioning hole receiving said fourth bracket.

5. The guide rail of claim 4 further comprising a fourth guide rail segment above said first guide rail segment.

6. The guide rail of claim 5 further comprising a spacer, said spacer being at said first end and separating said first guide rail segment and said fourth guide rail segment.

7. The guide rail of claim 6 wherein:

said second guide rail segment has a second guide rail segment height;

said spacer has a spacer height; and said spacer height is equal to said second guide rail segment height so that said first guide rail segment is parallel to said fourth guide rail segment.

8. A guide rail for a conveyor having a conveying surface, a curve and an adjustment assembly with a first bracket, a second bracket and a third bracket, said guide rail comprising:

a first end;

a second end;

a first guide rail segment having a first guide rail segment first slot and a first guide rail segment second slot; and a second guide rail segment having a second guide rail segment first slot and a second guide rail segment second slot, wherein:

the first bracket is received through said first guide rail segment first slot;

the second bracket is received through said first guide rail segment second slot and said second guide rail segment first slot;

the third bracket is received through said second guide rail segment second slot;

said first guide rail segment is selectably lockable with respect to one of the first bracket or the second bracket; and said second guide rail segment is selectably lockable with respect to one of the second bracket or the third bracket.

9. The guide rail of claim 8 wherein:

said first guide rail segment has a first fastener selectively turnable into said first slot and a second fastener selectively turnable into said second slot, wherein one of said first fastener and said second fastener is selectively turned into one of said first slot and said second slot, respectively, to lock said first guide rail segment with respect to one of the first bracket or the second bracket.

10. The guide rail of claim 8 wherein:

said first guide rail segment first slot has a first guide rail segment first slot length;

said first guide rail segment second slot has a first guide rail segment second slot length; and said first guide rail segment first slot length is equal to said first guide rail segment second slot length.

11. A guide rail for a conveyor having a conveying surface, a curve and an adjustment assembly with a first bracket, a second bracket, and a third bracket, said guide rail comprising:

a first end;

a second end;

a first adjustment slot;

a second adjustment slot; and a position hole, wherein the first bracket is movably received through said first adjustment slot, the second bracket is stationarily received through said position hole and the third bracket is movably received through said second adjustment slot.

12. The guide rail of claim 11, wherein:

said first adjustment slot is at said first end;

said second adjustment slot is at said second end; and said position hole is midway between said first adjustment slot and said second adjustment slot.

13. The guide rail of claim 12 wherein said guide rail further comprises a first relief between said first adjustment slot and said position hole and a second relief between said second adjustment slot and said position hole.

14. The guide rail of claim 13 wherein:

said guide rail has an inside facing the conveying surface and an outside facing away from the conveying surface;

said first relief and said second relief are on said outside of said guide rail.

15. A guide rail for a conveyor having a conveying surface, a curve and an adjustment assembly with a first bracket, a second bracket, and a third bracket, said guide rail comprising:

a first end;

a second end;

a first adjustment slot;

a second adjustment slot; and a third adjustment slot, wherein:

the first bracket is received through said first adjustment slot, the second bracket is received through said second adjustment slot and the third bracket is received through said third adjustment slot; and one of the first bracket, the second bracket or the third bracket can be locked in place with respect to said guide rail with a lock.

16. The guide rail of claim 15 wherein:

said first adjustment slot has a plurality of first adjustment lock holes therethrough;

said second adjustment slot has a plurality of second adjustment lock holes therethrough; and said third adjustment slot has a plurality of third adjustment lock holes therethrough.

17. The guide rail of claim 15 wherein said lock is a fastener that can be selectively turned into one of said first adjustment slot, said second adjustment slot or said third adjustment slot.

18. The guide rail of claim 15 wherein said second adjustment slot has a lock hole in a longitudinal center of said guide rail.

* * * * *